US012758974B2

(12) United States Patent
Fan et al.

(10) Patent No.: US 12,758,974 B2
(45) Date of Patent: Oct. 13, 2026

(54) SUBSTRATE FOR DRIVING DROPLETS, MANUFACTURING METHOD THEREOF, AND MICROFLUIDIC DEVICE

(71) Applicants: Beijing BOE Sensor Technology Co., Ltd., Beijing (CN); BOE TECHNOLOGY GROUP CO., LTD., Beijing (CN)

(72) Inventors: Bolin Fan, Beijing (CN); Le Gu, Beijing (CN); Yingying Zhao, Beijing (CN); Wenliang Yao, Beijing (CN); Yongjia Gao, Beijing (CN); Qiuxu Wei, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1252 days.

(21) Appl. No.: 17/599,999

(22) PCT Filed: Dec. 25, 2020

(86) PCT No.: PCT/CN2020/139603
§ 371 (c)(1),
(2) Date: Sep. 29, 2021

(87) PCT Pub. No.: WO2022/134064
PCT Pub. Date: Jun. 30, 2022

(65) Prior Publication Data
US 2022/0395832 A1 Dec. 15, 2022

(51) Int. Cl.
*B01L 3/00* (2006.01)

(52) U.S. Cl.
CPC . *B01L 3/502761* (2013.01); *B01L 2200/0647* (2013.01); *B01L 2300/0645* (2013.01);
(Continued)

(58) Field of Classification Search
CPC ......... B01L 2300/0887; B01L 2200/06; B01L 3/502715; B01L 3/502746;
(Continued)

(56) References Cited

U.S. PATENT DOCUMENTS

| | | | | |
|---|---|---|---|---|
| 2006/0194331 A1* | 8/2006 | Pamula | ................ | B81B 3/0021 422/400 |
| 2011/0063548 A1 | 3/2011 | Yoshida et al. | | |

(Continued)

FOREIGN PATENT DOCUMENTS

| | | | |
|---|---|---|---|
| CN | 101559914 A | 10/2009 | |
| CN | 202893370 U | 4/2013 | |

(Continued)

OTHER PUBLICATIONS

Madison et al., Fluid Transport in Partially Shielded Electrowetting on Dielectric Digital Microfluidic Devices, Journal of Microelectromechanical Systems, 2016, 25, 593-605 (Year: 2016).*

(Continued)

*Primary Examiner* — Shizhi Qian
(74) *Attorney, Agent, or Firm* — Myers Bigel, P.A.

(57) ABSTRACT

The present disclosure provides a substrate for driving droplets, a manufacturing method thereof, and a microfluidic device. The substrate includes a first base substrate a plurality of leads on the first base substrate a plurality of driving electrodes on a side of the plurality of leads away from the first base substrate, and a shielding electrode on the side of the plurality of leads away from the first base substrate and grounded. Each of the plurality of leads is electrically connected to at least one of the plurality of driving electrodes, an orthographic projection of the shielding electrode on the first base substrate and an orthographic projection of at least one of the plurality of leads on the first base substrate at least partially overlap, and the shielding electrode is
(Continued)

electrically insulated from the plurality of driving electrodes.

20 Claims, 9 Drawing Sheets

(52) U.S. Cl.
CPC . *B01L 2300/0861* (2013.01); *B01L 2300/161* (2013.01); *B01L 2400/0427* (2013.01)

(58) Field of Classification Search
CPC ..... B01L 2300/0645; B01L 2300/0816; B01L 2300/0819; B01L 2300/161; B01L 2400/0415; B01L 3/502761; B01L 2200/10; B01L 3/502792; B01L 2200/16; B01L 3/5027; B01L 2300/0636; B01L 3/50273; B01L 2200/0668; B01L 2300/0861; B01L 2300/0877; B01L 2300/0883; B01L 2400/043; B01L 2400/0487; B01L 2300/087; B01L 2300/088; B01L 2300/12; B01L 2300/165; B01L 2300/18; B01L 2400/0427; B01L 3/00; B01L 9/527; B01L 2200/027; B01L 2200/0647; B01L 2200/0652; B01L 2200/0684; B01L 2300/08; B01L 2300/0829; B01L 2300/0864; B01L 2300/168; B01L 2400/022; B01L 2400/0418; B01L 2400/0421; B01L 2400/0475; B01L 2400/084; B01L 2400/086; B01L 3/50857; B01L 7/52; B01L 2200/028; B01L 2200/0689; B01L 2300/027; B01L 2300/06; B01L 2300/0609; B01L 2300/0627; B01L 2300/0851; B01L 2300/0858; B01L 2400/0406; B01L 3/502723; B01L 3/502753; B01L 3/502784; B01L 3/502707; G01N 27/226; G01N 33/5438; G01N 2015/1415; G01N 15/1484; G01N 2021/0346
See application file for complete search history.

(56) References Cited

U.S. PATENT DOCUMENTS

| | | | | |
|---|---|---|---|---|
| 2014/0224654 | A1 | 8/2014 | Casasanta | |
| 2015/0220173 | A1 | 8/2015 | Lu et al. | |
| 2016/0318021 | A1* | 11/2016 | Pamula ............... | B01L 3/50273 |
| 2017/0185225 | A1 | 6/2017 | Ding et al. | |
| 2017/0320059 | A1* | 11/2017 | Hadwen ............ | B01L 3/502707 |
| 2018/0001286 | A1 | 1/2018 | Wu | |
| 2019/0126280 | A1* | 5/2019 | Gach ................... | B01L 3/50273 |
| 2020/0254457 | A1 | 8/2020 | Jia et al. | |
| 2020/0316590 | A1* | 10/2020 | Xi ........................ | H03K 17/687 |
| 2020/0338549 | A1 | 10/2020 | Zhao et al. | |
| 2021/0060547 | A1 | 3/2021 | Liu et al. | |
| 2021/0197163 | A1 | 7/2021 | Geng et al. | |

FOREIGN PATENT DOCUMENTS

| | | | | |
|---|---|---|---|---|
| CN | 103353818 | A | | 10/2013 |
| CN | 104571769 | A | | 4/2015 |
| CN | 107118955 | A | | 9/2017 |
| CN | 108717340 | A | | 10/2018 |
| CN | 109174219 | A | | 1/2019 |
| CN | 109261233 | A | | 1/2019 |
| CN | 109414663 | A | | 3/2019 |
| CN | 109917964 | A | | 6/2019 |
| CN | 109926110 | A | * | 6/2019 |
| CN | 110787843 | A | | 2/2020 |
| CN | 109917964 | B | | 4/2022 |

OTHER PUBLICATIONS

Office Action for CN application No. 202080003655.8 with machine translation mailed Apr. 28, 2023, 14 pages.
Extended European Search Report corresponding to European Patent Application No. 20966628.8 (8 pages) (dated Nov. 29, 2023).
Office Action for CN application No. 202080003655.8 with machine translation mailed Nov. 30, 2023, 16 pages.

* cited by examiner

SUBSTRATE FOR DRIVING DROPLETS, MANUFACTURING METHOD THEREOF, AND MICROFLUIDIC DEVICE

RELATED APPLICATIONS

The present application is a 35 U.S.C. 371 national stage application of PCT International Application No. PCT/CN2020/139603 filed on Dec. 25, 2020, the entire disclosure of which is incorporated herein by reference.

TECHNICAL FIELD

The present disclosure relates to the field of biomedical detection, and in particular to a substrate for driving droplets, a method for manufacturing the substrate, and a microfluidic device comprising the substrate.

BACKGROUND

Microfluidics is a technology for precise control and manipulation of micro-scale fluids. With this technology, the basic operation units such as sample preparation, reaction, separation, and detection involved in the detection and analysis process can be integrated into a centimeter-level chip. Microfluidics is generally applied to the analysis process of trace drugs in the fields of biology, chemistry, medicine and so on. Microfluidic devices have advantages such as low sample consumption, fast detection speed, simple operation, multi-functional integration, small size and easy portability, and have huge application potential in the fields of biology, chemistry, medicine and so on.

SUMMARY

According to an aspect of the present disclosure, a substrate for driving droplets is provided, comprising: a first base substrate; a plurality of leads on the first base substrate; a plurality of driving electrodes on a side of the plurality of leads away from the first base substrate; and a shielding electrode on the side of the plurality of leads away from the first base substrate and grounded. Each of the plurality of leads is electrically connected to at least one of the plurality of driving electrodes, and an orthographic projection of the shielding electrode on the first base substrate and an orthographic projection of at least one of the plurality of leads on the first base substrate at least partially overlap, and the shielding electrode and the plurality of driving electrodes are electrically insulated.

In some embodiments, the shielding electrode and the plurality of driving electrodes are in a same layer, and a part of the shielding electrode is around each of the plurality of driving electrodes.

In some embodiments, the substrate further comprises a first bonding area and a second bonding area on the first base substrate. Each of the plurality of leads is electrically connected to at least one of the first bonding area and the second bonding area.

In some embodiments, the plurality of driving electrodes comprise a first portion, the driving electrodes in a same column in the first portion are electrically connected to at least one of one bonding electrode of the first bonding area and one bonding electrode of the second bonding area via a same lead; and a direction of the column is an extending direction of the plurality of leads.

In some embodiments, the plurality of driving electrodes further comprise a second portion, the driving electrodes in a same column in the second portion and a part of the plurality of leads are one by one correspondence, and each of the driving electrodes in the same column is electrically connected to at least one of the first bonding area and the second bonding area via a corresponding lead.

In some embodiments, at least a part of each of the plurality of leads extends in a linear direction.

In some embodiments, the plurality of driving electrodes comprise a third portion close to a side of the first bonding area, and the third portion comprises a plurality of driving electrodes, and the first bonding area comprises a first bonding electrode and a second bonding electrode, and the first bonding electrode is electrically connected to each odd-numbered driving electrode of the driving electrodes in the third portion via a first lead of the plurality of leads, and the second bonding electrode is electrically connected to each even-numbered driving electrode of the driving electrodes in the third portion via a second lead of the plurality of leads.

In some embodiments, an orthographic projection of the first lead on the first base substrate is at least partially between an orthographic projection of the driving electrodes electrically connected to the second lead on the first base substrate and an orthographic projection of the first bonding area on the first base substrate; and an orthographic projection of the second lead on the first base substrate is at least partially between an orthographic projection of the driving electrodes electrically connected to the first lead on the first base substrate and an orthographic projection of the second bonding area on the first base substrate.

In some embodiments, the plurality of driving electrodes comprise a third portion close to a side of the first bonding area, and the third portion comprises a plurality of driving electrodes, and the first bonding area comprises a first bonding electrode, a second bonding electrode, and a third bonding electrode, the first bonding electrode is electrically connected to the $(3N-2)^{th}$ driving electrodes of the driving electrodes in the third portion via a first lead of the plurality of leads, the second bonding electrode is electrically connected to the $(3N-1)^{th}$ driving electrodes of the driving electrodes in the third portion via a second lead of the plurality of leads, and the third bonding electrode is electrically connected to the $(3N)^{th}$ driving electrodes of the driving electrodes in the third portion via a third lead of the plurality of leads, N is a positive integer greater than or equal to 1.

In some embodiments, an orthographic projection of the first lead on the first base substrate is at least partially between an orthographic projection of the driving electrodes respectively electrically connected to the second lead and the third lead on the first base substrate and an orthographic projection of the first bonding area on the first base substrate. An orthographic projection of the second lead on the first base substrate is at least partially between an orthographic projection of the driving electrodes respectively electrically connected to the first lead and the third lead on the first base substrate and an orthographic projection of the second bonding area on the first base substrate. An orthographic projection of the third lead on the first base substrate is at least partially between orthographic projections of two adjacent driving electrodes on the first base substrate, the two adjacent driving electrodes are respectively a driving electrode electrically connected to the first lead and a driving electrode electrically connected to the second lead.

In some embodiments, the plurality of driving electrodes comprise at least a first region, a second region, and a third region that are sequentially arranged in a lateral direction, and the lateral direction is a direction perpendicular to an extending direction of the plurality of leads in a plane defined by the plurality of driving electrodes.

In some embodiments, the driving electrodes in the first region comprise at least a first driving electrode, a second driving electrode, and a third driving electrode that are sequentially arranged along the lateral direction. An orthographic projection of the first driving electrode on the first base substrate is a trapezoid, and orthographic projections of the second driving electrode and the third driving electrode on the first base substrate are both rectangular. A distance between any two adjacent driving electrodes of the first driving electrode, the second driving electrode and the third driving electrode is 20 μm.

In some embodiments, the driving electrodes in the second region comprise a fourth driving electrode and a fifth driving electrode that are sequentially arranged along the lateral direction and a sixth driving electrode and a seventh driving electrode on both sides of the fourth driving electrode and the fifth driving electrode. Orthographic projections of the fourth driving electrode and the fifth driving electrode on the first base substrate are both square, and orthographic projections of the sixth driving electrode and the seventh driving electrode on the first base substrate are both rectangular. A distance between any two adjacent driving electrodes of the fourth driving electrode, the fifth driving electrode, the sixth driving electrode, and the seventh driving electrode is 20 μm.

In some embodiments, the driving electrodes in the third region comprise at least an eighth driving electrode and a ninth driving electrode that are sequentially arranged along the lateral direction, orthographic projections of the eighth driving electrode and the ninth driving electrode on the first base substrate are both square, and a distance between the eighth driving electrode and the ninth driving electrode is 20 μm.

In some embodiments, the plurality of driving electrodes comprise at least a first region, a second region, and a third region, and the first region comprises a first sub-region and a second sub-region, the first sub-region and the second sub-region are respectively arranged along a first direction, the second region is between the first sub-region and the second sub-region along a second direction, and the third region is respectively arranged at both ends of the first sub-region along the first direction and both ends of the second sub-region along the first direction. The first direction is a direction perpendicular to an extending direction of the plurality of leads in a plane defined by the plurality of driving electrodes, the second direction is a direction parallel to the extending direction of the plurality of leads in the plane defined by the plurality of driving electrodes.

In some embodiments, an orthographic projection of each driving electrode in the first region and an orthographic projection of each driving electrode in the second region on the first base substrate are square, and an orthographic projection of each driving electrode in the third region on the first base substrate is rectangular.

In some embodiments, an arrangement density of the plurality of leads electrically connected to the plurality of driving electrodes in the second region is greater than an arrangement density of the plurality of leads electrically connected to the plurality of driving electrodes in the third region.

In some embodiments, each of the plurality of driving electrodes is electrically connected to one of the plurality of leads via a via hole. A plurality of via holes corresponding to the first sub-region and the third region at both ends of the first sub-region along the first direction are arranged in a straight line in the first direction. A plurality of via holes corresponding to the second sub-region and the third region at both ends of the second sub-region along the first direction are arranged in a straight line in the first direction. A part of a plurality of via holes corresponding to the second region is arranged along a first straight line, another part of the plurality of via holes corresponding to the second region is arranged along a second straight line, and the first straight line and the second straight line intersect on a side of the second region close to the second sub-region.

In some embodiments, an orthographic projection of each of the plurality of leads on the first base substrate only partially overlaps an orthographic projection of the driving electrode electrically connected to the lead on the first base substrate.

In some embodiments, each of the plurality of driving electrodes is electrically connected to one of the plurality of leads via at least two via holes.

In some embodiments, each of the plurality of driving electrodes is electrically connected to one of the plurality of leads via eight via holes.

According to another aspect of the present disclosure, a microfluidic device is provided, the microfluidic device comprises the substrate described in any of the foregoing embodiments, another substrate opposite to the substrate, and a space between the substrate and the another substrate. The another substrate comprises: a second base substrate; a conductive layer on the second base substrate; and a hydrophobic layer on a side of the conductive layer away from the second base substrate.

In some embodiments, a ratio of a length of each of the plurality of driving electrodes in a lateral direction to a thickness of the space in a direction perpendicular to the first base substrate is between 5 and 20, the lateral direction is a direction perpendicular to an extending direction of the plurality of leads in a plane defined by the plurality of driving electrodes.

BRIEF DESCRIPTION OF THE DRAWINGS

In order to more clearly describe the technical solutions in the embodiments of the present disclosure, the drawings that need to be used in the embodiments are briefly introduced below. Obviously, the drawings described below are only some embodiments of the present disclosure. For those of ordinary skill in the art, other drawings can be obtained based on these drawings without creative work.

DETAILED DESCRIPTION OF THE DISCLOSURE

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

In the following description, the term "droplet" as used herein refers to a fluid with conductive properties.

Microfluidic devices are being studied more and more since they have many advantages, such as less sample consumption, fast detection speed, simple operation, multi-functional integration, small size and easy portability. In the field of biological detection, with the increasing requirements for biological detection accuracy, people have higher and higher requirements for the accuracy of the microfluidic device for the manipulation of objects to be processed (for example, droplets).

The basic principle of microfluidic device application is the principle of electrowetting-on-dielectric (EWOD). The principle of electrowetting-on-dielectric refers to changing the surface tension between the liquid (such as a droplet) and the solid by adjusting the potential applied between the liquid and the solid, so that the contact angle between the two can be changed and the droplet can therefore be driven to move. This principle can be expressed by the following formula (1):

$$\cos\theta = \cos\theta_0 + \frac{\varepsilon_0 \varepsilon_r \Delta V^2}{2d\gamma_{1g}} \tag{1}$$

In the above formula (1), $\theta_0$ is the three-phase (such as gas, liquid, and solid) contact angle of the droplet when no potential is applied, $\theta$ is the three-phase contact angle of the droplet after the potential is applied, $\varepsilon_0$ is the vacuum dielectric constant, $\varepsilon_r$ is the relative dielectric constant of the dielectric layer, $\Delta V$ is the potential difference between the two sides of the dielectric layer, $\gamma_{1g}$ is the surface tension coefficient of the liquid-gas interface, and d is the thickness of the dielectric layer. It can be seen from the above formula (1) that $\Delta V$ has a very significant effect on the change of $\theta$, and thus has a very significant effect on the driving for the droplets.

The inventor(s) found that in a conventional microfluidic device, the voltage of the leads used to electrically connect the driving electrode affects the driving effect of the driving electrode on the droplet, resulting in inaccurate droplet volume during the droplet generation process, and reducing the accuracy of droplet generation.

Figure 1A:
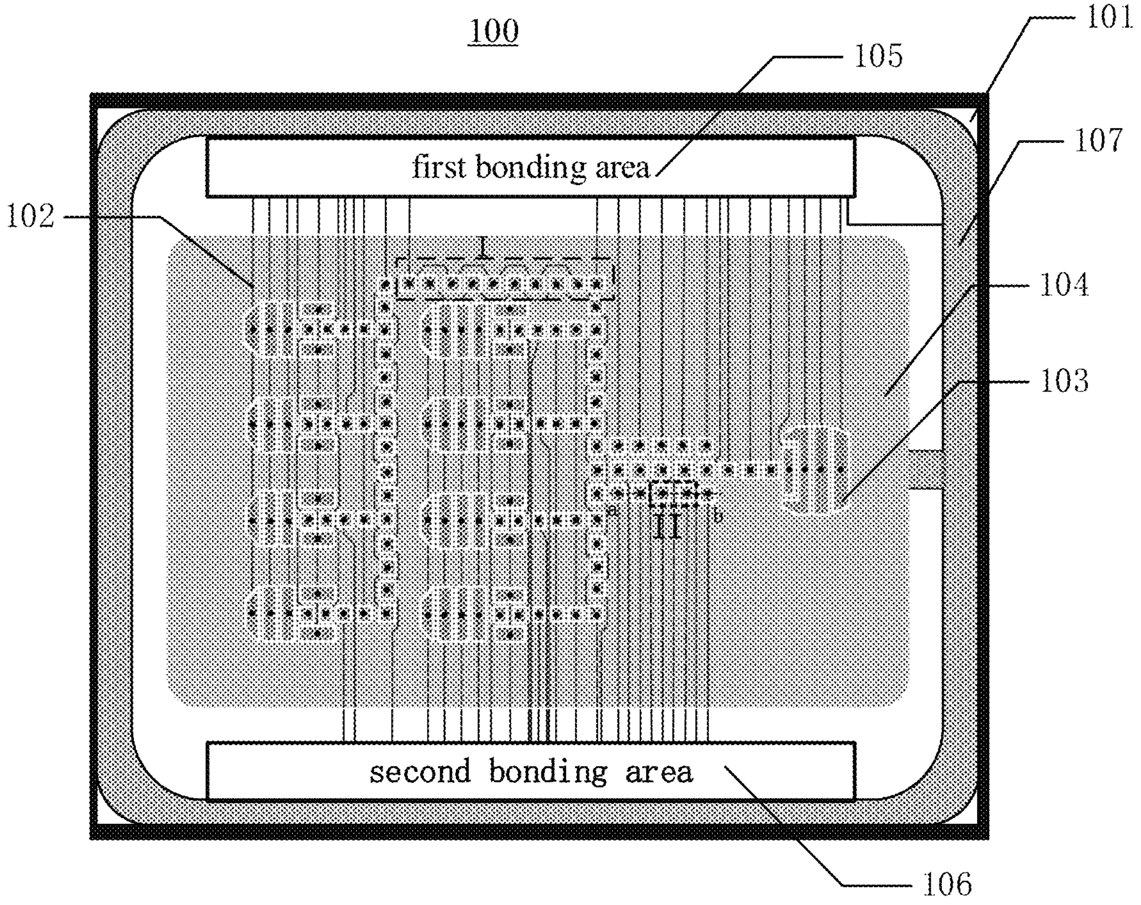
FIG. 1A illustrates a top view of a substrate according to an embodiment of the present disclosure.
Figure 1B:
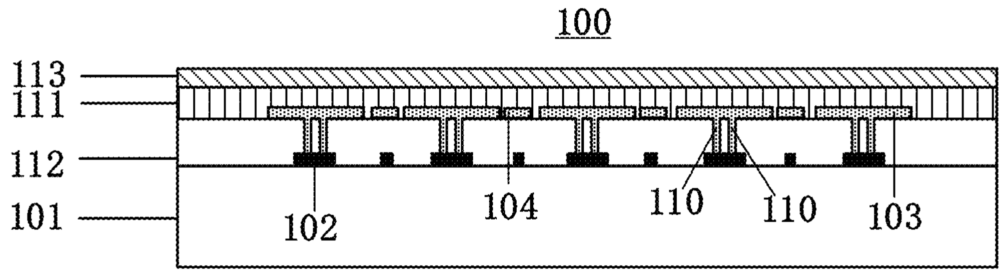
FIG. 1B illustrates a cross-sectional view taken along the line a-b in FIG. 1A.

According to an aspect of the present disclosure, a substrate for driving droplet is provided, hereinafter referred to as a substrate. FIG. 1A illustrates a top view of the substrate 100, and FIG. 1B illustrates a cross-sectional view taken along the line a-b of FIG. 1A. Referring to FIGS. 1A and 1B, the substrate 100 comprises: a first base substrate 101; a plurality of leads 102 located on the first base substrate 101; a plurality of driving electrodes 103 located on a side of the plurality of leads 102 away from the first base substrate 101; and a shielding electrode 104 located on the side of the plurality of leads 102 away from the first base substrate 101 and grounded. Each of the plurality of leads 102 is electrically connected to at least one of the plurality of driving electrodes 103. An orthographic projection of the shielding electrode 104 on the first base substrate 101 and an orthographic projection of at least one of the plurality of leads 102 on the first base substrate 101 at least partially overlap, and the shielding electrode 104 is electrically insulated from the plurality of driving electrodes 103.

It should be noted that although FIG. 1B illustrates that the plurality of driving electrodes 103 and the shielding electrode 104 are located in the same layer, this is only an example, and the embodiment of the present disclosure is not limited to this. In an alternative example, the shielding electrode 104 may also be located between the layer where the plurality of leads 102 are located and the layer where the plurality of driving electrodes 103 are located. The position of the shielding electrode 104 only needs to be able to ensure that the shielding electrode 104 can at least partially shield the voltage of the lead 102.

It should be noted that the substrate 100 provided by the embodiments of the present disclosure can be used not only in the microfluidic device, but also in any other suitable devices, comprising but not limited to a display panel, a display device, an electronic paper device, a mobile phone, a tablet computer, a navigator, etc.

By positioning the shielding electrode 104 above the plurality of leads 102 and making the orthographic projection of the shielding electrode 104 on the first base substrate 101 to at least partially overlap with the orthographic projection of at least one of the plurality of leads 102 on the first base substrate 101, the shielding electrode 104 can shield the electric field caused by the voltage of the leads 102 underneath the plurality of driving electrodes 103, so that the electric field of the leads 102 does not interfere with the driving of the droplets contained in the microfluidic device including the substrate 100 by the driving electrodes 103, and the droplet can perform corresponding actions (such as moving, separating, mixing, etc.) in the expected manner and path, so as to ensure the accurate droplet volume during the droplet generation process and improve the generation accuracy of the droplet.

In some embodiments, as illustrated in FIGS. 1A and 1B, the shielding electrode 104 and the plurality of driving electrodes 103 are located in the same layer, and a part of the shielding electrode 104 is located around each of the plurality of driving electrodes 103, that is, the shielding electrode 104 surrounds each of the plurality of driving electrodes 103. In a partial area of FIG. 1A, for example, in the area II, a lead 102 is arranged below an area which is between two adjacent driving electrodes 103. By locating a part of the shielding electrode 104 around any one of the plurality of driving electrodes 103, the shielding electrode 104 can shield the influence of the voltage of the lead 102 between the two adjacent driving electrodes 103 on the driving for droplets. Thereby, it further ensures that the accurate droplet volume is generated during the droplet generation process, and further improves the accuracy of droplet generation.

It should be noted that the phrase "a plurality of elements are located in the same layer" as used throughout this text means that the plurality of elements are located on the surface of the same layer and have substantially the same height or thickness. For example, "the shielding electrode 104 and the plurality of driving electrodes 103 are located in the same layer" means that the shielding electrode 104 and the plurality of driving electrodes 103 are both located on the surface of the insulating layer 112 (described later), and the shielding electrode 104 and the plurality of driving electrodes 103 have substantially the same height or thickness in the direction perpendicular to the first base substrate 101.

Figure 1C:
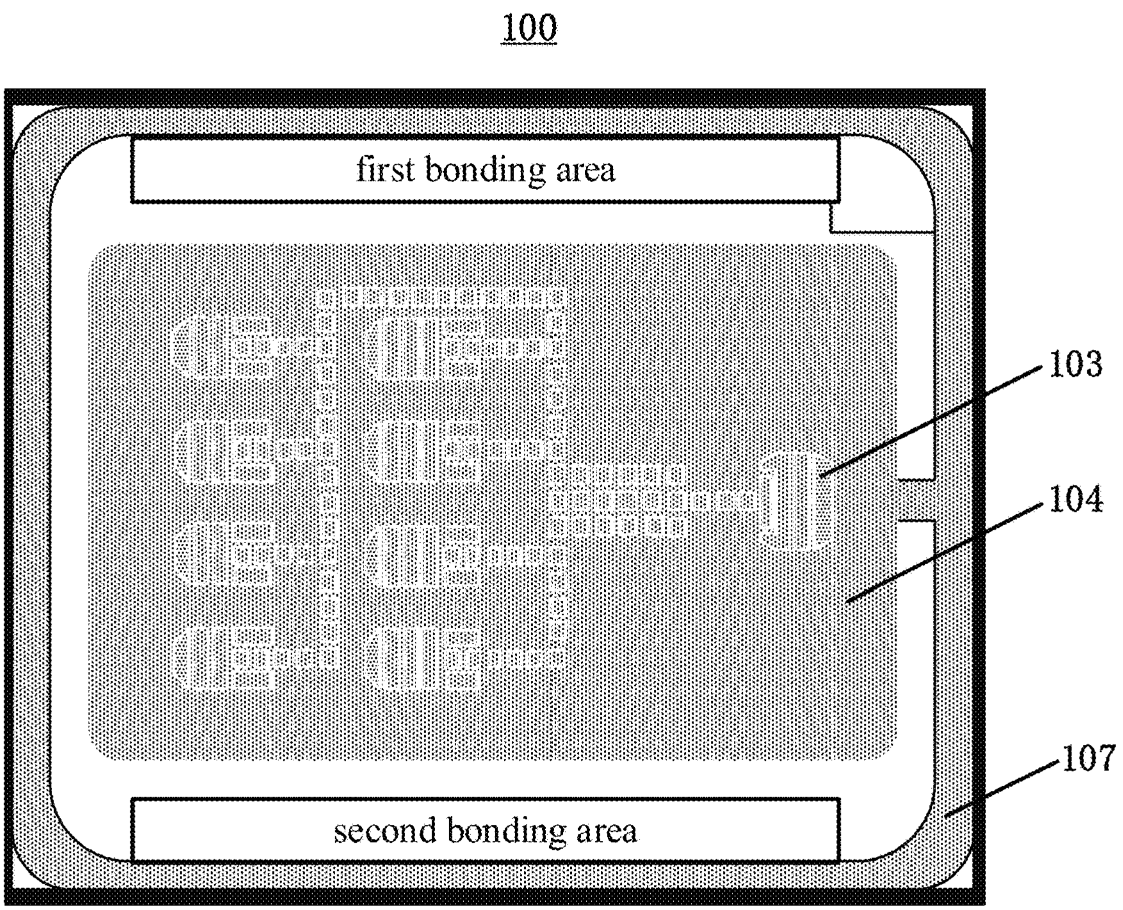
FIG. 1C illustrates another top view of a substrate according to an embodiment of the present disclosure.

Referring to FIG. 1C, the substrate 100 further comprises a ground electrode 107 located in the same layer as the shielding electrode 104. In some embodiments, the plurality of driving electrodes 103, the shielding electrode 104, and the ground electrode 107 may be located in the same layer. The ground electrode 107 surrounds the shielding electrode 104 on the periphery of the shielding electrode 104 and is electrically connected to the shielding electrode 104, and the ground electrode 107 can be electrically connected to the first bonding area 105 (described later) through a wire in the same layer as the shielding electrode 104, so that the shielding electrode 104 can be provided with a suitable voltage (for example, 0 V) through the first bonding area 105. The driving electrodes 103, the shielding electrode 104, and the ground electrode 107 may be made of the same conductive material, for example, may be made of metal molybdenum (Mo), so that the driving electrodes 103, the shielding electrode 104, and the ground electrode 107 can be formed by one patterning process. The thickness of the driving electrodes 103, the shielding electrode 104, and the ground electrode 107 is approximately 220 nm, and the gap between each driving electrode 103 and the shielding electrode 104 is approximately 4 μm.

Figure 1D:
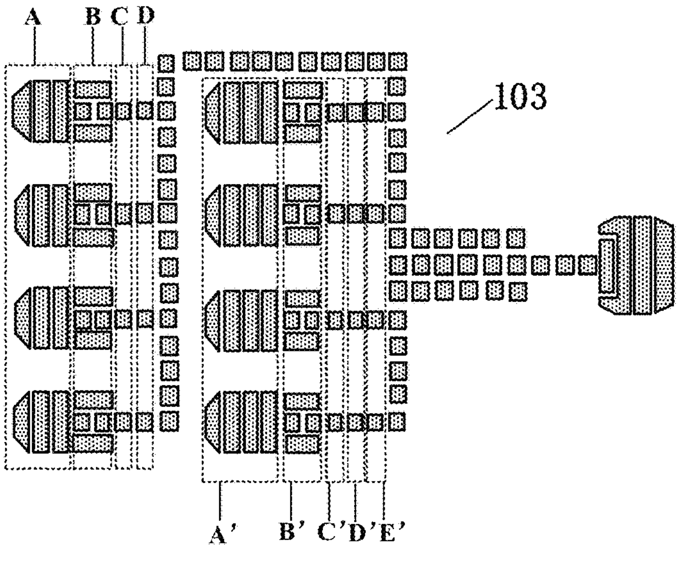
FIG. 1D illustrates a top view of the driving electrodes in FIG. 1A.

FIG. 1D illustrates the plurality of driving electrodes 103 in FIG. 1A. In FIG. 1D, each independent small block (such as a square block, a rectangular block, a trapezoidal block, etc.) represents a driving electrode 103, and the spacing between the driving electrodes 103 is about 20 μm. The gap between two adjacent driving electrodes 103 can be used to arrange the lead 102, and the line width of the lead 102 is about 4 μm, as illustrated in FIG. 1B. In the substrate 100, the driving electrodes 103 actually comprise multiple modules such as a reagent generation area, a sampling area, a temperature control area, a sample inlet area, a quality inspection area, and a waste liquid area. In the drawings provided in the embodiments of the present disclosure, for clarity, only some of the modules are illustrated. The left part of FIG. 1D illustrates eight substantially identical modules, which are used to control the movement of the droplets. Eight modules are arranged in two rows, and each row comprises four modules. Each module communicates with each other through a square driving electrode 103 of about 1 mm*1 mm. By applying a corresponding potential to each driving electrode 103, under the dielectric wetting effect, the three-phase contact angle of the droplet becomes smaller, resulting in asymmetrical deformation of the droplet and an internal pressure difference, thereby driving the droplet to move.

As illustrated in FIG. 1D, the four modules in the left row are divided into a first region A, a second region B, and a third region C and D, and the four modules in the right row are divided into a first region A', a second region B', and a third region C', D' and E'. The first region, the second region, and the third region are sequentially arranged along a lateral direction, which refers to a direction perpendicular to the extending direction of the plurality of leads 102 in the plane defined by the plurality of driving electrodes 103, that is, the horizontal direction in FIG. 1D.

The plurality of driving electrodes 103 in the first region A or A' comprise at least a first driving electrode, a second driving electrode, and a third driving electrode that are sequentially arranged along the lateral direction. An orthographic projection of the first driving electrode on the first base substrate 101 is a trapezoid, the orthographic projections of the second driving electrode and the third driving electrode on the first base substrate 101 are both rectangular, and the distance between any two adjacent driving electrodes of the first driving electrode, the second driving electrode, and the third driving electrode is about 20 μm. The first driving electrode, the second driving electrode, and the third driving electrode may have any suitable size, and the embodiment of the present disclosure does not specifically limit their size. For example, the orthographic projection of the first driving electrode on the first base substrate 101 may be an isosceles trapezoid with an upper side length of 1 mm, a lower side length of 3 mm, and a distance between the upper side length and the lower side length of 1 mm; the orthographic projections of the second driving electrode and the third driving electrode on the first base substrate 101 may be a rectangle of 1 mm*3 mm (corresponding to three rectangular driving electrodes of 1 mm*3 mm in the first region A').

The driving electrodes in the second region B or B' comprise a fourth driving electrode and a fifth driving electrode sequentially arranged in the lateral direction and a sixth driving electrode and a seventh driving electrode on both sides of the fourth driving electrode and the fifth driving electrode. The orthographic projections of the fourth driving electrode and the fifth driving electrode on the first base substrate 101 are both square, and the orthographic projections of the sixth driving electrode and the seventh driving electrode on the first base substrate 101 are both rectangular. The distance between any two adjacent driving electrodes of the fourth driving electrode, the fifth driving electrode, the sixth driving electrode, and the seventh driving electrode is about 20 μm. The fourth driving electrode, the fifth driving electrode, the sixth driving electrode, and the seventh driving electrode may have any suitable size, and the embodiment of the present disclosure does not specifically limit their size. For example, the orthographic projections of the fourth driving electrode and the fifth driving electrode on the first base substrate 101 may be a square with a side length of 1 mm*1 mm; the orthographic projections of the sixth driving electrode and the seventh driving electrode on the first base substrate 101 may be a rectangle of 1 mm*2 mm.

The driving electrodes in the third region C and D comprise at least an eighth driving electrode and a ninth driving electrode (an eighth driving electrode, a ninth driving electrode, and a tenth driving electrode if they are in the third region C', D' and E'). The orthographic projections of the eighth driving electrode and the ninth driving electrode on the first base substrate 101 are both square, and the distance between the eighth driving electrode and the ninth driving electrode is about 20 μm. The eighth driving electrode and the ninth driving electrode may have any suitable size, and the embodiment of the present disclosure does not specifically limit their size. For example, the orthographic projections of the eighth driving electrode and the ninth driving electrode on the first base substrate 101 may be a square with a side length of 1 mm*1 mm.

Figure 2A:
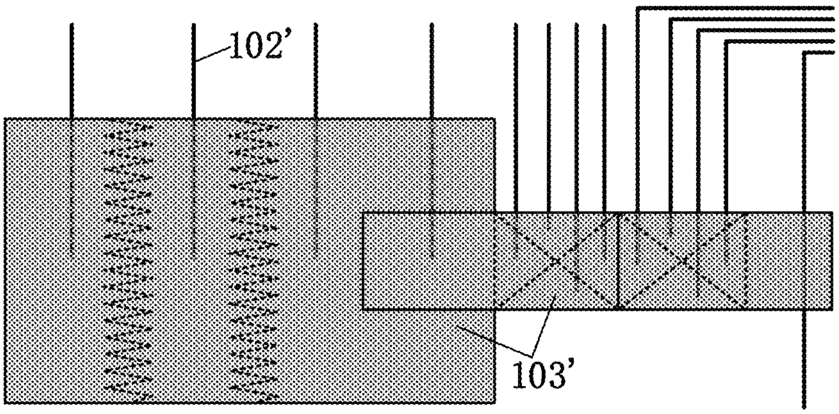
FIG. 2A illustrates a schematic structural diagram of a microfluidic device in the related art.
Figure 2B:
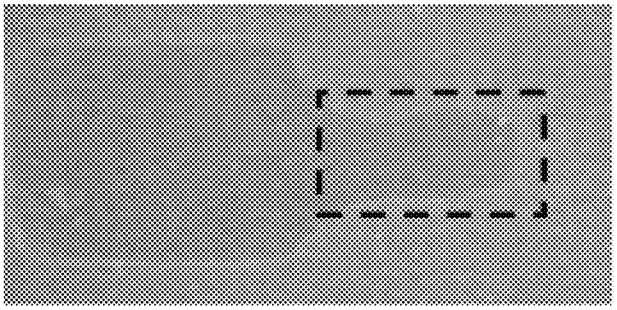
FIG. 2B illustrates a picture of droplets generated by the microfluidic device of FIG. 2A.

FIG. 2A illustrates a schematic structural diagram of a microfluidic device in the related art. As illustrated in FIG. 2A, the microfluidic device comprises a plurality of leads 102' and driving electrodes 103' located above the leads 102', and the microfluidic device does not comprise a shielding electrode. FIG. 2B illustrates a picture of droplets generated by the microfluidic device of FIG. 2A. It can be seen from FIG. 2B that the edges of the droplets generated by the microfluidic device are irregular, especially the edges of the droplets in the area illustrated by the black dashed frame in FIG. 2B are very irregular. The part within the black dashed line frame is the part of the droplet that will be separated from the droplets to generate the required volume, and the droplet shape in this area determines the volume of the droplet to be generated. Due to the irregular edges of the droplets, it is impossible to accurately calculate the volume of the droplet to be generated, resulting in a decrease in the accuracy of droplet generation. The reason for the irregular edges of the droplets is that the microfluidic device is not provided with a shielding electrode, so the electric field formed by the leads 102' under the driving electrodes 103' strongly interferes with the driving electrodes 103', making the driving electrodes 103' unable to accurately control droplets, resulting in droplets with extremely irregular edges.

Referring back to FIG. 1B, the substrate 100 further comprises a dielectric layer 111 which is located on a side of the plurality of driving electrodes 103 away from the first base substrate 101 and covers the plurality of driving electrodes 103. The dielectric layer 111 may be formed of any appropriate material and may have any appropriate thickness in a direction perpendicular to the first base substrate 101, which is not limited in the embodiment of the present disclosure. In one embodiment, the material of the dielectric layer 111 is polyimide (PI), and the thickness of the dielectric layer 111 in the direction perpendicular to the first base substrate 101 is about 38 μm. In an alternative embodiment, the material of the dielectric layer 111 is $Al_2O_3$, and the thickness of the dielectric layer 111 in the direction perpendicular to the first base substrate 101 is about 300 nm.

Figure 3A:
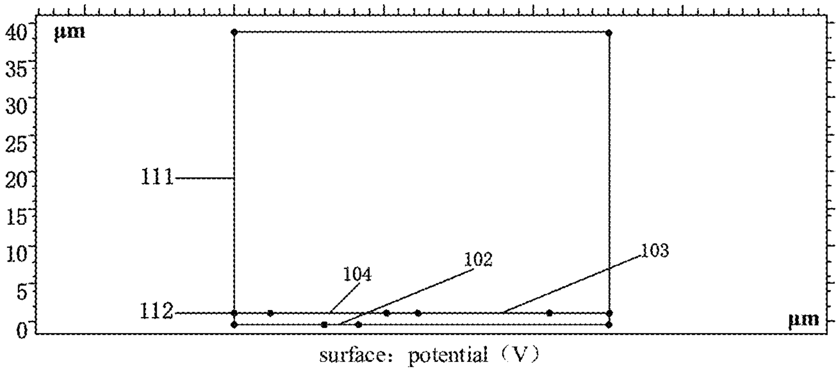
FIG. 3A illustrates a model for electric field distribution simulation according to an embodiment of the present disclosure.
Figure 3B:
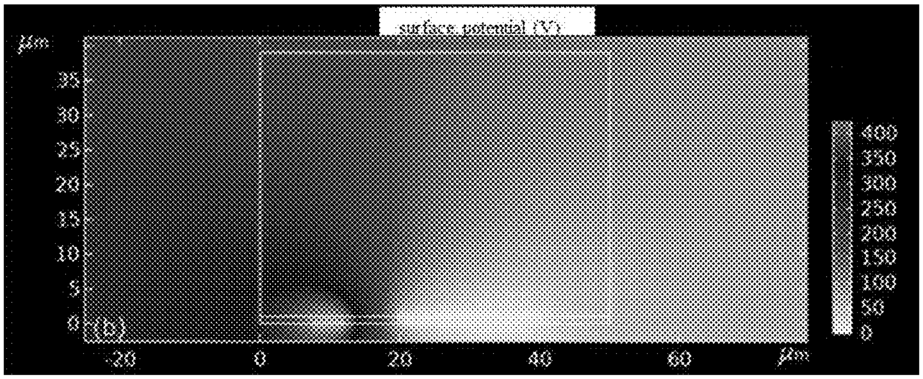
FIG. 3B illustrates a simulation diagram of electric field distribution of a substrate.

FIG. 3A illustrates a model used for the simulation of the electric field distribution of the substrate 100. The objects involved in the model comprise the lead 102, the driving electrode 103, the shielding electrode 104, the dielectric layer 111 and the insulating layer 112. The first horizontal line immediately above the abscissa of FIG. 3A represents the lead 102, and the second horizontal line above the first horizontal line represents the driving electrode 103 and the shielding electrode 104. In this model, a polyimide film with a thickness of 38 μm is selected for the dielectric layer 111, and the voltage of the lead 102 is set to 180 Vrms. FIG. 3B illustrates a simulation diagram of the electric field distribution assuming that the substrate 100 is not provided with the shielding electrode 104, and the simulation diagram of the electric field distribution illustrates that the voltage directly above the lead 102 is 62 Vrms. The center of FIG. 3B illustrates the model used in FIG. 3A, that is, the first horizontal line immediately above the abscissa of FIG. 3B represents the lead 102, and the second horizontal line above the first horizontal line represents the driving electrode 103 and the shielding electrode 104. The right side of FIG. 3B is the potential scale, and different values indicate different potentials. The smaller the value, the smaller the potential, and the lighter the corresponding color; the larger the value, the greater the potential, and the darker the corresponding color. It can be seen from FIG. 3B that the color above the driving electrode 103 has different shades and is very uneven, and the darker color occupies a relatively large area. This means that the potential distribution above the driving electrode 103 is not uniform, and most of them are potentials with a large value, that is, there is a large electric field above the driving electrode 103. This is because there is no shielding electrode to shield the larger voltage caused by the underneath leads 102, so that a larger electric field is generated around the driving electrode 103. The voltage of the leads 102 interferes with the driving of the droplets by the driving electrode 103, so that the edge shape of the droplets is irregular, and the droplets exhibit the irregular shape illustrated in FIG. 2B.

Figure 3C:
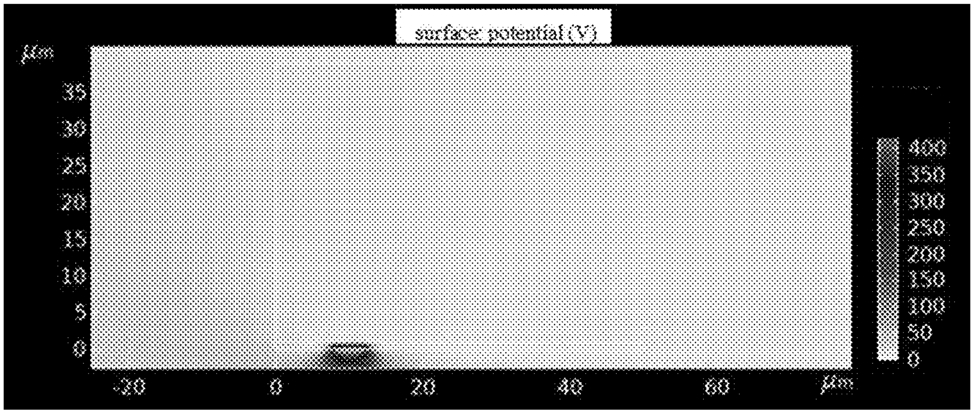
FIG. 3C illustrates a simulation diagram of electric field distribution of a substrate according to an embodiment of the present disclosure.

FIG. 3C illustrates a simulation diagram of the electric field distribution of the substrate 100 according to an embodiment of the present disclosure. The simulation diagram of the electric field distribution illustrates that the voltage directly above the lead 102 is 6 Vrms, which does not have any influence on the edge shape of the droplets. The right side of FIG. 3C is the potential scale, and different values indicate different potentials. Same as FIG. 3B, the smaller the value, the smaller the potential, and the lighter the corresponding color; the larger the value, the greater the potential, and the darker the corresponding color. It can be seen from FIG. 3C that the color above the driving electrode 103 is relatively uniform, and the lighter color occupies most of the area. This means that the potential distribution above the driving electrode 103 is relatively uniform, and most of them are potentials with a very small value, that is, there is a very small electric field above the driving electrode 103. This is because each driving electrode 103 is surrounded by the shielding electrode 104 so that the shielding electrode 104 can shield the voltage of the lead 102 located under the driving electrode 103. Therefore, the voltage of the lead 102 does not interfere with the driving of the droplet by the driving electrode 103, so that the droplet can perform corresponding actions (such as moving, separating, mixing, etc.) in the expected manner and path, thereby ensuring that the accurate droplet volume is generated during the droplet generation process, and has excellent droplet generation accuracy.

Figure 4A:
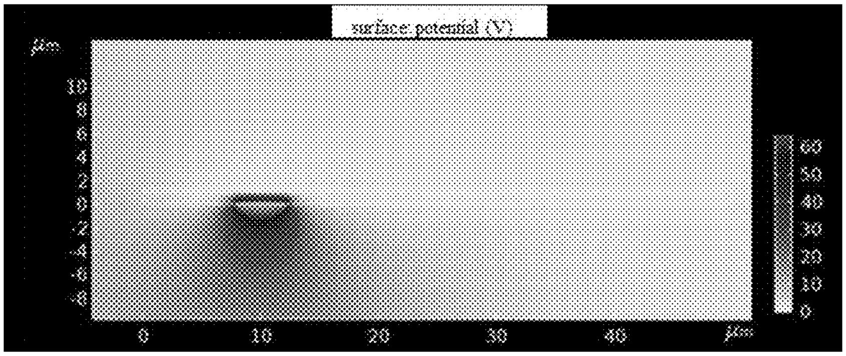
FIG. 4A illustrates a simulation diagram of electric field distribution of a substrate according to an embodiment of the present disclosure.
Figure 4B:
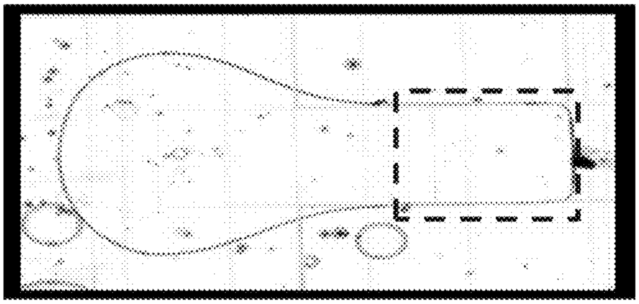
FIG. 4B illustrates a picture of droplets generated by a microfluidic device comprising the substrate according to an embodiment of the present disclosure.

FIG. 4A illustrates a simulation diagram of the electric field distribution of the substrate 100 when another model is adopted. In this model, the dielectric layer 111 uses a 300 nm $Al_2O_3$ film with a large dielectric constant, and other settings are the same as the model illustrated in FIG. 3A. Through simulation calculation, the voltage directly above the lead 102 is 0.06 Vrms, which is lower than the voltage illustrated in FIG. 3C. FIG. 4B is a picture of the droplet during generating droplets by the microfluidic device comprising the substrate 100. It can be seen from FIG. 4B that the edge of the droplet is very regular, especially the edge of the droplet in the area of the black dotted line frame is very regular, which is in good agreement with the shape of the driving electrode 103 under the droplet. This can ensure that the accurate droplet volume is generated during the droplet generation process, and has excellent droplet generation accuracy.

Microfluidic devices are generally divided into active digital microfluidic devices and passive digital microfluidic devices. Active digital microfluidic devices usually need to be equipped with separate switching elements (such as thin film transistors) for each driving electrode, which is complicated and costly. The passive digital microfluidic device can usually drive all the driving electrodes through an integrated driving circuit. Due to its large cost advantage, passive digital microfluidic devices are currently the mainstream commercialized devices. However, in a conventional passive digital microfluidic device, the number of driving electrodes is usually the same as the number of boding electrodes in the driving circuit, that is, when n driving electrodes are provided in the passive digital microfluidic device, correspondingly, n boding electrodes must be provided. This greatly limits the number of driving electrodes in the passive digital microfluidic device with limited space, thereby limiting the improvement of the integration of the passive digital microfluidic device, which does not facilitate the integration and miniaturization of the device.

In the embodiment of the present disclosure, referring back to FIG. 1A, the substrate 100 further comprises a first bonding area 105 and a second bonding area 106 on the first base substrate 101. Although FIG. 1A illustrates that the first bonding area 105 is located at one end of the plurality of leads 102 along the extending direction (that is, located at the area near the top of the first base substrate 101), and the second bonding area 106 is located at the other end of the plurality of leads 102 opposite to the one end along the extending direction (that is, located at the area near the bottom of the first base substrate 101). However, the positions of the first bonding area 105 and the second bonding area 106 are not limited to this. In some embodiments, the first bonding area 105 and the second bonding area 106 may also be arranged at any suitable positions, such as the left side, the right side, the upper left, and the lower right of the first base substrate 101. The embodiments of the present disclosure do not specifically limit the positions of the first bonding area 105 and the second bonding area 106. Each of the plurality of leads 102 is electrically connected to the first bonding area 105 or the second bonding area 106 to electrically connect the corresponding driving electrode 103 to the first bonding region 105 or the second bonding region 106.

In some embodiments, the plurality of driving electrodes 103 comprise a first portion, the driving electrodes 103 located in the same column in the first portion are electrically connected to the same bonding electrode in the first bonding area 105 or the second bonding area 106 via the same lead 102. It should be noted that the "column" here refers to the vertical direction in FIG. 1A, that is, the direction of the column refers to the extending direction of the plurality of leads 102. Specifically, referring to FIGS. 1A and 1D, in the first region A and the area D in the third region, the four driving electrodes 103 located in the same column are electrically connected to the same bonding electrode in the first bonding area 105 via the same lead 102, that is, the four driving electrodes 103 only use one bonding electrode. In the second region B, eight driving electrodes 103 represented by rectangular blocks are electrically connected to the same bonding electrode in the first bonding region 105 via the same lead 102. The eight driving electrodes 103 represented by square blocks are divided into two columns of driving electrodes 103, and each column is electrically connected to the same bonding electrode in the first bonding region 105 via a lead 102. The four modules in the right row in FIG. 1D are basically the same as the four modules in the left row, except that the four modules in the right row are electrically connected to the second bonding area 106. Specifically, in the first region A' and the areas D' and E' in the third region, the four driving electrodes 103 located in the same column are electrically connected to the same bonding electrode in the second bonding region 106 via the same lead 102. In the second region B', eight driving electrodes 103 represented by rectangular blocks are electrically connected to the same bonding electrode in the second bonding region 106 via the same lead 102. The eight driving electrodes 103 represented by square blocks are divided into two columns of driving electrodes 103, and each column is electrically connected to the same bonding electrode in the second bonding region 106 via a lead 102. By optimizing the wiring of the leads 102, only one bonding electrode is used for the multiple driving electrodes 103 in the same column. Compared with one driving electrode corresponding to one bonding electrode in the related art, this greatly reduces the number of bonding electrodes used, which is beneficial to improve the integration of the substrate 100 and is beneficial to realize the integration and miniaturization of the substrate 100.

On this basis, in order to achieve a separate driving capability for each module of the plurality of driving electrodes 103, in some embodiments, the plurality of driving electrodes 103 further comprise a second portion, the driving electrodes 103 located in the same column in the second portion correspond to a part of the plurality of leads 102 in a one-to-one correspondence, and each of the driving electrodes 103 in the same column is electrically connected to the first bonding area 105 or the second bonding area 106 via a corresponding lead 102. Specifically, continuing to refer to FIGS. 1A and 1D, in the area C of the third region, in the four square driving electrodes 103 in the same column, each driving electrode 103 (that is, the third square driving electrode 103 from the left in each module in the left row) is electrically connected to the first bonding region 105 via a respective lead 102. In the area C' of the third region, in the four square driving electrodes 103 in the same column, each driving electrode 103 (that is, the third square driving electrode 103 from the left in each module in the right row) is also electrically connected to the second bonding region 106 via a respective lead 102. By wiring the leads 102 in this way, individual control of the driving electrodes 103 located in the areas C or C' in each module can be achieved.

In some embodiments, in the area I of FIG. 1A, different wiring schemes of the leads 102 are designed according to the different sizes of the droplets, so as to further reduce the number of bonding electrodes on the premise that the droplets can be driven according to the product design requirements.

Figure 5A:
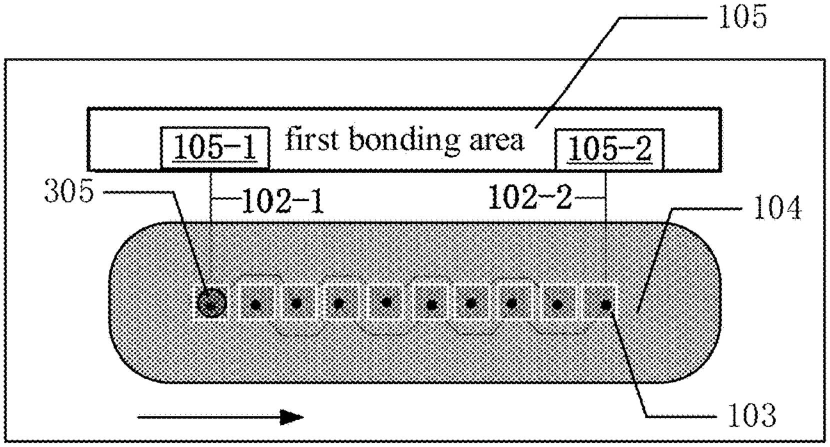
FIG. 5A illustrates an enlarged view of area I in FIG. 1A.

FIG. 5A is an enlarged view of the area I in FIG. 1A when the volume of the droplet 305 covers about one driving electrode 103. As illustrated in the figure, on a side close to the first bonding area 105, the plurality of driving electrodes 103 comprise ten square driving electrodes 103 arranged in sequence along the direction indicated by the arrow in the figure. The first bonding area 105 comprises a first bonding electrode 105-1 and a second bonding electrode 105-2. The first bonding electrode 105-1 is electrically connected to the first, third, fifth, seventh, and ninth driving electrodes 103 from left to right among the ten square driving electrodes 103 through the first lead 102-1, and the second bonding electrode 105-2 is electrically connected to the second, fourth, sixth, eighth, and tenth driving electrodes 103 from left to right among the ten square driving electrodes 103 through a second lead 102-2. Through this wiring method, the plurality of driving electrodes 103 (the first, third, fifth, seventh, and ninth driving electrodes 103) can be electrically connected to one first bonding electrode 105-1 via a lead 102-1, and the plurality of driving electrodes 103 (the second, fourth, sixth, eighth, and tenth driving electrodes 103) can be electrically connected to one second bonding electrode 105-2 via a lead 102-2, so that the number of bonding electrodes used can be further reduced. It should be noted that the ten square driving electrodes 103 illustrated here are only an example. In other embodiments, the area I may also include any appropriate number of driving electrodes 103. The embodiment of the present disclosure does not specifically limit the number of driving electrodes 103 in the area I. For example, when a plurality of driving electrodes 103 are comprised in the area I, the first bonding electrode 105-1 is electrically connected to each odd-numbered driving electrode 103 of the plurality of driving electrodes 103 via the first lead 102-1, and the second bonding electrode 105-2 is electrically connected to each even-numbered driving electrode 103 of the plurality of driving electrodes 103 via the second lead 102-2.

Continuing to refer to FIG. 5A, an orthographic projection of the first lead 102-1 on the first base substrate 101 is at least partially located between the orthographic projections of the driving electrodes 103 electrically connected to the second lead 102-2 on the first base substrate 101 and an orthographic projection of the first bonding area 105 on the first base substrate 101; and, an orthographic projection of the second lead 102-2 on the first base substrate 101 is at least partially located between the orthographic projections of the driving electrodes 103 electrically connected to the first lead 102-1 on the first base substrate 101 and an orthographic projection of the second bonding area 106 on the first base substrate 101. Specifically, the orthographic projection of the first lead 102-1 on the first base substrate 101 is at least partially located between the orthographic projections of the second, fourth, sixth, eighth, and tenth driving electrodes 103 on the first base substrate 101 and the orthographic projection of the first bonding area 105 on the first base substrate 101, that is, the orthographic projection of the first lead 102-1 on the first base substrate 101 and the orthographic projections of the second, fourth, sixth, eighth, and tenth driving electrodes 103 on the first base substrate 101 do not overlap; the orthographic projection of the second lead 102-2 on the first base substrate 101 is at least partially located between the orthographic projections of the third, fifth, seventh, and ninth driving electrodes 103 on the first base substrate 101 and the orthographic projection of the second bonding area 106 on the first base substrate 101, that is, the orthographic projection of the second lead 102-2 on the first base substrate 101 and the orthographic projections of the third, fifth, seventh, and ninth driving electrodes 103 on the first base substrate 101 do not overlap. With such a wiring method in combination with the shielding electrode 104, the interference of the voltage of the leads 102 to the driving electrode 103 can be further reduced. By providing a voltage signal to the driving electrodes 103 through the first bonding electrode 105-1 and the second bonding electrode 105-2 at intervals, the movement of the droplets can be accurately controlled.

Figure 5B:
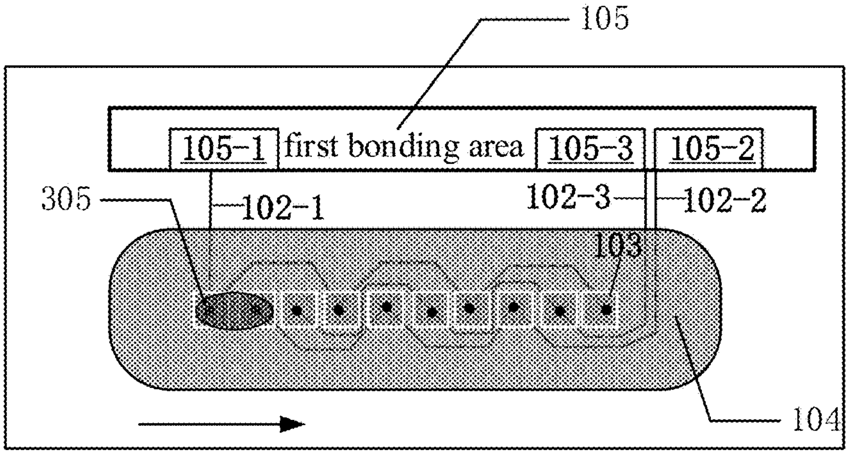
FIG. 5B illustrates an enlarged view of area I in FIG. 1A.

FIG. 5B is an enlarged view of the area I in FIG. 1A when the volume of the droplet 305 covers about two driving electrodes 103. As illustrated in the figure, on a side close to the first bonding area 105, the plurality of driving electrodes 103 comprise ten square driving electrodes 103 arranged in sequence along the direction indicated by the arrow in the figure. The first bonding area 105 comprises a first bonding electrode 105-1, a second bonding electrode 105-2, and a third bonding electrode 105-3. The first bonding electrode 105-1 is electrically connected to the first, fourth, seventh, and tenth driving electrodes 103 from left to right among the ten square driving electrodes 103 through the first lead 102-1, the second bonding electrode 105-2 is electrically connected to the second, fifth, and eighth driving electrodes 103 from left to right among the ten square driving electrodes 103 through the second lead 102-2, the third bonding electrode 105-3 is electrically connected to the third, sixth, and ninth driving electrodes 103 from left to right among the ten square driving electrodes 103 through the third lead 102-3. Through such a wiring method, a plurality of driving electrodes 103 (the first, fourth, seventh, and tenth driving electrodes 103) can be electrically connected to one first bonding electrode 105-1 via the lead 102-1, a plurality of driving electrodes 103 (the second, fifth, and eighth driving electrodes 103) may be electrically connected to one second bonding electrode 105-2 via the lead 102-2, a plurality of driving electrodes 103 (the third, sixth, and ninth driving electrodes 103) may be electrically connected to one third bonding electrode 105-3 via the lead 102-3, so that the number of bonding electrodes used can be further reduced. It should be noted that the ten square driving electrodes 103 illustrated here are only an example. In other embodiments, the area I may also comprise any appropriate number of driving electrodes 103. The embodiment of the present disclosure does not specifically limit the number of driving electrodes 103 in the area I. For example, when a plurality of driving electrodes 103 are included in the area I, the first bonding electrode 105-1 is electrically connected to the $(3N-2)^{th}$ driving electrodes 103 of the plurality of driving electrodes 103 via the first lead 102-1, the second bonding electrode 105-2 is electrically connected to the $(3N-1)^{th}$ driving electrodes 103 of the plurality of driving electrodes 103 via the second lead 102-2, and the third bonding electrode 105-3 is electrically connected to the $(3N)^{th}$ driving electrodes 103 of the plurality of driving electrodes 103 via the third lead 102-3, N is a positive integer greater than or equal to 1.

Continuing to refer to FIG. 5B, an orthographic projection of the first lead 102-1 on the first base substrate 101 is at least partially located between the orthographic projections of the driving electrodes 103 respectively electrically connected to the second lead 102-2 and the third lead 102-3 on the first base substrate 101 and an orthographic projection of the first bonding area 105 on the first base substrate 101; an orthographic projection of the second lead 102-2 on the first base substrate 101 is at least partially located between the orthographic projections of the driving electrodes 103 respectively electrically connected to the first lead 102-1 and the third lead 102-3 on the first base substrate 101 and an orthographic projection of the second bonding area 106 on the first base substrate; an orthographic projection of the third lead 102-3 on the first base substrate 101 is at least partially located between the orthographic projections of two adjacent driving electrodes 103 on the first base substrate 101, and the two adjacent driving electrodes 103 refer to the driving electrode 103 electrically connected to the first lead 102-1 and the driving electrode 103 electrically connected to the second lead 102-2. Specifically, the orthographic projection of the first lead 102-1 on the first base substrate 101 is at least partially located between the orthographic projections of the second, third, fifth, sixth, eighth, and ninth driving electrodes 103 from left to right on the first base substrate 101 and the orthographic projection of the first bonding area 105 on the first base substrate 101, that is, the orthographic projection of the first lead 102-1 on the first base substrate 101 and the orthographic projections of the second, third, fifth, sixth, eighth, and ninth driving electrodes 103 on the first base substrate 101 do not overlap; the orthographic projection of the second lead 102-2 on the first base substrate 101 is at least partially located between the orthographic projections of the third, fourth, sixth, seventh, ninth, and tenth driving electrodes 103 on the first base substrate 101 from left to right and the orthographic projection of the second bonding area 106 on the first base substrate 101, that is, the orthographic projection of the second lead 102-2 on the first base substrate 101 and the orthographic projections of the third, fourth, sixth, seventh, ninth, and tenth driving electrodes 103 on the first base substrate 101 do not overlap; the orthographic projection of the third lead 102-3 on the first base substrate 101 is at least partially located between the orthographic projections of the adjacent fourth and fifth driving electrodes 103 from left to right and between the orthographic projections of the adjacent seventh and eighth driving electrodes 103 from left to right on the first base substrate 101. Only when the substrate 100 comprises the shielding electrode 104, the third lead 102-3 can be wired in this way, because the shielding electrode 104 can shield the voltage of the third lead 102-3 between two adjacent driving electrodes 103. If the shielding electrode 104 is not provided, the voltage of the third lead 102-3 between two adjacent driving electrodes 103 will interfere with the two adjacent driving electrodes 103, so that the driving electrode 103 cannot precisely control the movement of the droplet or even makes the control invalid. With the wiring scheme of the first lead 102-1, the second lead 102-2, and the third lead 102-3 provided by this embodiment, in combination with the shielding electrode 104, it can further reduce the interfere of voltages of the leads 102-1, 102-2, and 102-3 with the driving electrode 103. The first bonding electrode 105-1, the second bonding electrode 105-2, and the third bonding electrode 105-3 provide voltage signals to the driving electrodes 103 at intervals, so that the movement of the droplets can be accurately controlled.

Figure 6:
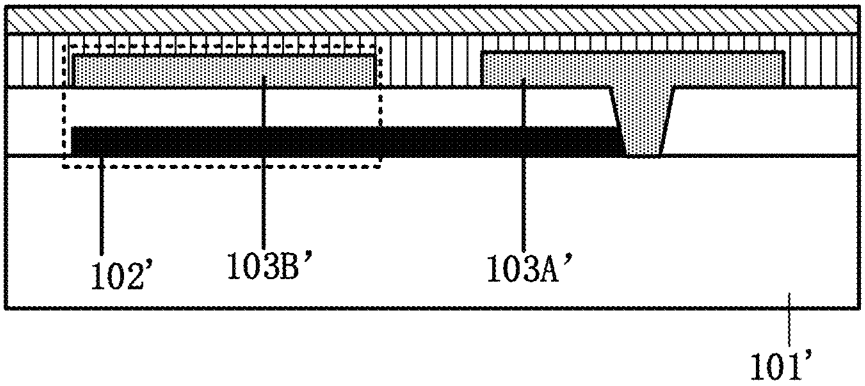
FIG. 6 illustrates a cross-sectional view of a substrate used in a microfluidic device in the related art.

In the related art, as illustrated in FIG. 6, the orthographic projection of the lead 102' on the first base substrate 101' not only overlaps with the orthographic projection of the driving electrode 103A' on the first base substrate 101' which is electrically connected to the lead 102', but also overlaps with the orthographic projection of the driving electrode 103B' on the first base substrate 101' which has no electrical connection relationship therewith. That is to say, the lead 102' is not only arranged directly below the driving electrode 103A' electrically connected to it, but also arranged directly below the driving electrode 103B' that is not electrically connected to it. When the lead 102' is wired below the driving electrode 103B', the lead 102' and the driving electrode 103B' will form a coupling capacitance C. The coupling capacitor C plus the resistance of the lead 102' itself will introduce crosstalk, thereby introducing an undesired coupling voltage $U_R$ to the driving electrode 103A' electrically connected to the lead 102':

$$U_R = U_I R \Big/ \sqrt{R^2 + \left(\frac{1}{\omega C}\right)^2}$$

In the above formula, R is the resistance of the lead 102', C is the coupling capacitance, ω is the angular frequency of the input signal, $U_I$ is the input signal voltage, and $U_R$ is the coupling voltage of the driving electrode 103A'.

The coupling voltage $U_R$ will affect the driving of the driving electrode 103A' to the droplet, especially when the resistance of the peripheral device is large (for example, when there is a large resistance between the bonding electrode and the system), the coupling voltage $U_R$ will increase, thereby further affecting the driving of the droplet by the driving electrode 103A', making it impossible to precisely control the movement of the droplet, and even causing the failure of the driving of the droplet.

Referring back to FIGS. 1A and 1B, in the substrate 100 provided by an embodiment of the present disclosure, the orthographic projection of each of the plurality of leads 102 on the first base substrate 101 only partially overlaps the orthographic projection of the driving electrode 103 electrically connected to the lead 102 on the first base substrate 101. It should be noted that the phrase "the orthographic projection of each of the plurality of leads 102 on the first base substrate 101 only partially overlaps the orthographic projection of the driving electrode 103 electrically connected to the lead 102 on the first base substrate 101" means that the orthographic projection of each lead 102 on the first base substrate 101 only partially overlaps the orthographic projection of the driving electrode 103 electrically connected to it on the first base substrate 101, and does not overlap with the orthographic projection of any other driving electrode 103 on the first base substrate 101 that is not electrically connected to it. However, it is not excluded that the orthographic projection of the lead 102 on the first base substrate 101 and the orthographic projection of the shielding electrode 104 on the first base substrate 101 overlap. That is to say, the above phrase only defines the relative positional relationship between the lead 102 and the driving electrode 103, but does not limit the relative positional relationship between the lead 102 and other components in the substrate 100. The substrate 100 provided by the embodiment of the present disclosure avoids arranging the lead 102 directly under the driving electrode 103 which has no electrical connection relationship therewith. Therefore, the coupling capacitance and thus the introduction of crosstalk can be minimized, the influence of the coupling voltage on the driving of the droplets can be effectively reduced, and the control accuracy of the droplets can be improved.

As described above, in the substrate 100, the plurality of driving electrodes 103 are arranged in a very compact manner, and the gap between any two adjacent driving electrodes 103 is very small (for example, about 20 μm). In the design of this compact structure, the embodiments of the present disclosure design different wiring manners of the leads 102 according to the different module requirements of the driving electrodes 103. For example, referring to FIGS. 1A and 1D, in the area corresponding to the first region A or A' of the driving electrode 103, each lead 102 is arranged in a substantially straight line, and one lead 102 is connected to a plurality of driving electrodes 103 in the same column;

in the area corresponding to the second region B or B' of the driving electrode 103, a part of the leads 102 is arranged in a bending line to avoid wiring under the driving electrode 103 that is not electrically connected to it; in the area I and on both sides of the area I, one lead 102 is connected to each odd-numbered driving electrode 103 in a bending line, and the other lead 102 is connected to each even-numbered driving electrode 103 in a bending line. By optimizing the wiring method of the leads 102, not only the number of bonding electrodes can be reduced, but also the leads 102 can be prevented from being wired under the driving electrode 103 that is not electrically connected to it. In addition, excellent coordination with the design of each module of the driving electrode 103 can also be achieved.

Figure 7A:
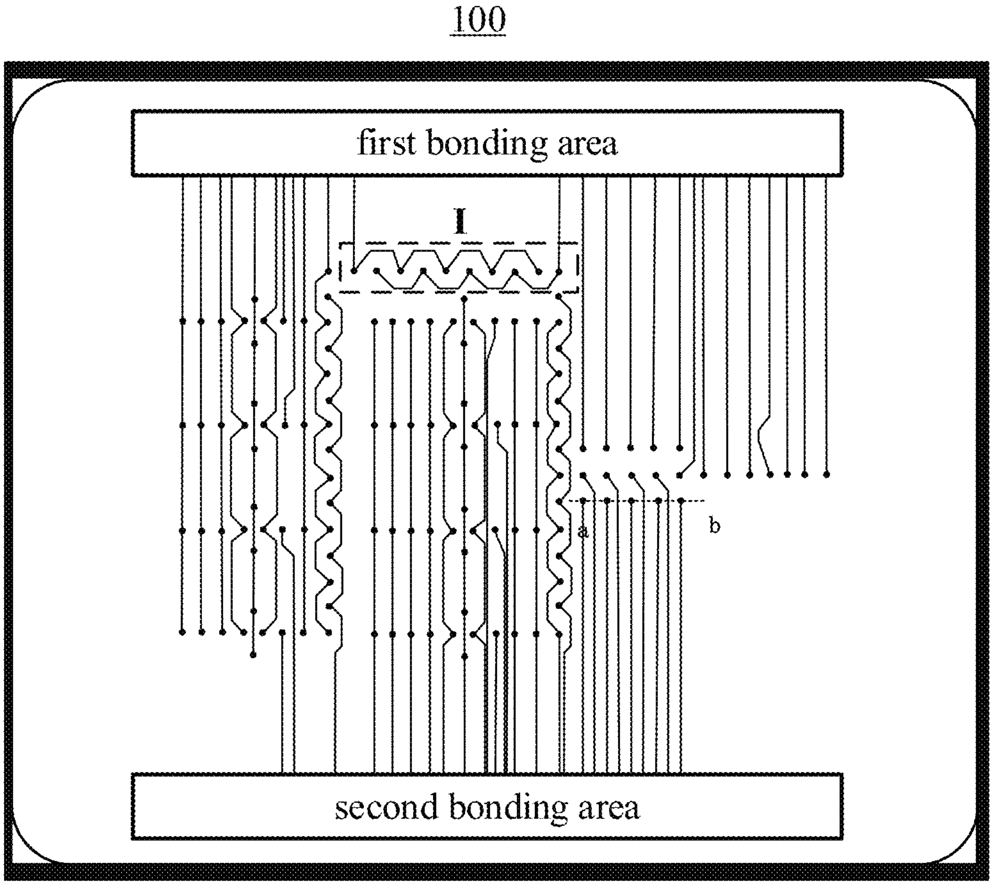
FIG. 7A illustrates another top view of a substrate according to an embodiment of the present disclosure.
Figure 7B:
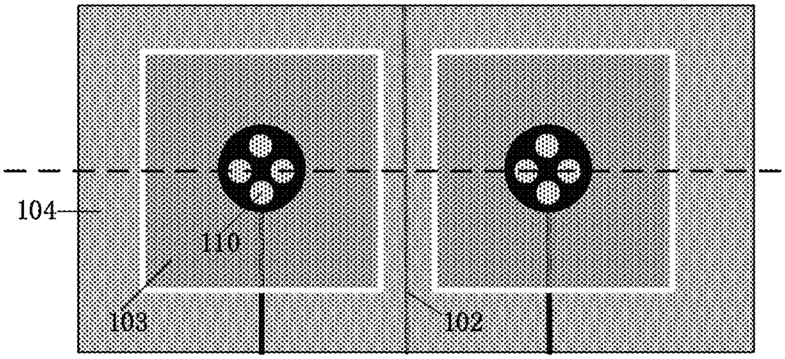
FIG. 7B illustrates an enlarged view of area II in FIG. 1A.

FIG. 7A is a top view after omitting the driving electrodes 103, the shielding electrode 104, and the ground electrode 107 in FIG. 1A, and FIG. 7B is an enlarged view of the area II in FIG. 1A. In some embodiments, each of the plurality of driving electrodes 103 is electrically connected to one of the plurality of leads 102 via at least two via holes 110. In FIG. 1A, for example, each driving electrode 103 is electrically connected to one lead 102 via four via holes 110. As can be seen from FIGS. 7A and 7B, each lead 102 comprises a circular connection platform at the electrical connection where the lead 102 is connected to the corresponding driving electrode 103. The diameter of the circular connection platform is about 100 μm, and the diameter of the four circular via holes 110 embedded in the circular connection platform is respectively about 20 μm. It should be noted that the shape of the via hole 110 is not limited to a circle, and it can also be any other suitable shape, such as a square, a rectangle, a hexagon, an octagon, an irregular shape, and the like. Correspondingly, the connection platform can also have any suitable shape. Various suitable materials can be selected for the lead 102, which is not specifically limited in the embodiment of the present disclosure. In one example, the material of the lead 102 is molybdenum (Mo), and its thickness is about 220 nm.

By electrically connecting each driving electrode 103 to one lead 102 via four via holes 110, the reliability of the substrate 100 can be effectively improved. This is because the driving voltage of the substrate 100 is usually relatively high. For example, when the material of the dielectric layer 111 is polyimide, the driving voltage of the substrate 100 is as high as 180 Vrms, and the via holes of the substrate 100 are usually at risk of burnout under high voltage. In the embodiment of the present disclosure, there are a number of via holes between each driving electrode 103 and the lead 102 and the hole diameter is large, which can effectively reduce the resistance of the via hole. In addition, by electrically connecting each driving electrode 103 to one lead 102 via four via holes 110, it is possible to prevent the failure of the substrate 100 caused by partial via holes being burnt. For example, when one of the four via holes 110 is burned out, there are three other via holes 110 to realize the conduction between the driving electrode 103 and the lead 102, so as to avoid the failure of the substrate 100, and improve the reliability of the substrate 100.

In some embodiments, referring back to FIG. 1B, the substrate 100 may further comprise an insulating layer 112 and a hydrophobic layer 113. As illustrated in the figure, the insulating layer 112 is located between the first base substrate 101 and the plurality of driving electrodes 103, and the hydrophobic layer 113 is located on a side of the dielectric layer 111 away from the first base substrate 101. The insulating layer 112 and the hydrophobic layer 113 can be formed of any appropriate material, and the insulating layer 112 and the hydrophobic layer 113 can have any appropriate thickness. The embodiment of the present disclosure does not specifically limit the material and thickness of the insulating layer 112 and the hydrophobic layer 113. In one example, the insulating layer 112 is formed of $SiN_x$ material, and its thickness in the direction perpendicular to the first base substrate 101 is approximately in the range of 0.6-1.5 μm. This thickness can effectively reduce the leakage between the layer where the leads 102 are located and the layer where the driving electrodes 103 are located. The hydrophobic layer 113 can prevent droplets from penetrating into the interior of the substrate 100 and reduce the loss of droplets. The surface of the hydrophobic layer 113 is generally relatively flat, thereby facilitating the movement of the droplets. Exemplarily, the hydrophobic layer 113 may be formed of Teflon, and its thickness in a direction perpendicular to the first base substrate 101 is about 60 nm.

In summary, in simple terms, the substrate 100 provided by the embodiments of the present disclosure shields the influence of the voltage of the lead 102 on the driving of the droplets by providing the shielding electrode 104, thereby improving the generation accuracy of the droplets; by optimizing the wiring method of the lead 102, multiple driving electrodes 103 in the same column can be electrically connected to the same bonding electrode via a lead 102, thereby reducing the number of bonding electrodes; moreover, different wiring schemes are designed according to the different sizes of the droplets, which further reduces the number of bonding electrodes under the premise of ensuring the smooth driving of the droplets; by avoiding arranging the lead 102 directly below the driving electrode 103 that is not electrically connected to it, the influence of crosstalk is minimized, and the influence of the coupling voltage on the driving of the droplet is effectively reduced; and by increasing the number of via holes between the driving electrode 103 and the lead 102, the reliability of the substrate 100 is effectively improved.

Figure 8A:
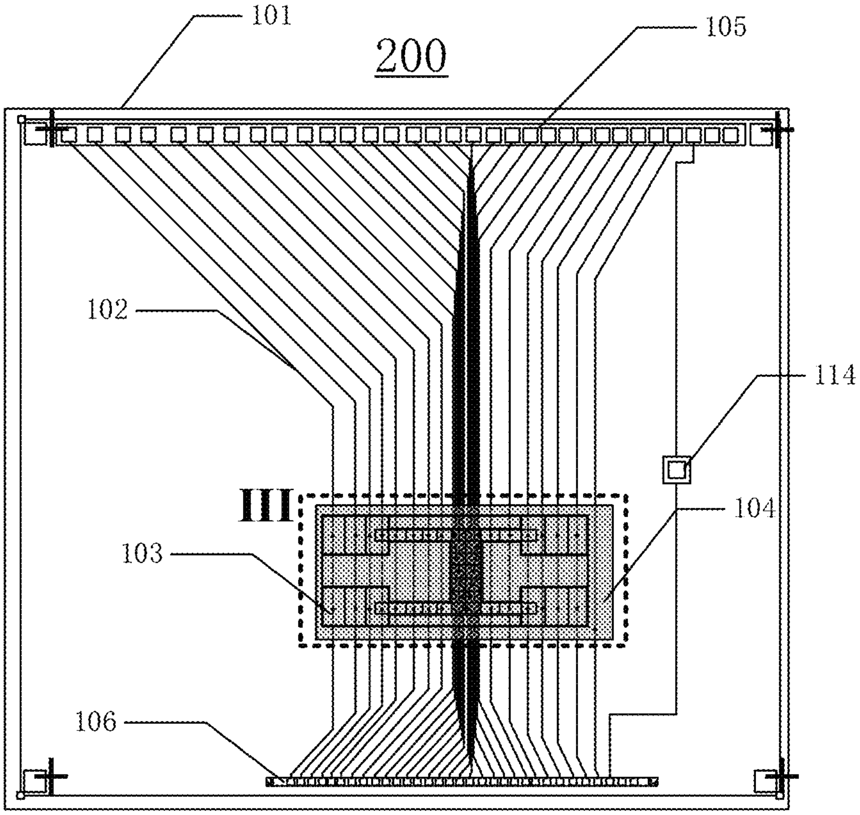
FIG. 8A illustrates another top view of a substrate according to an embodiment of the present disclosure.
Figure 8B:
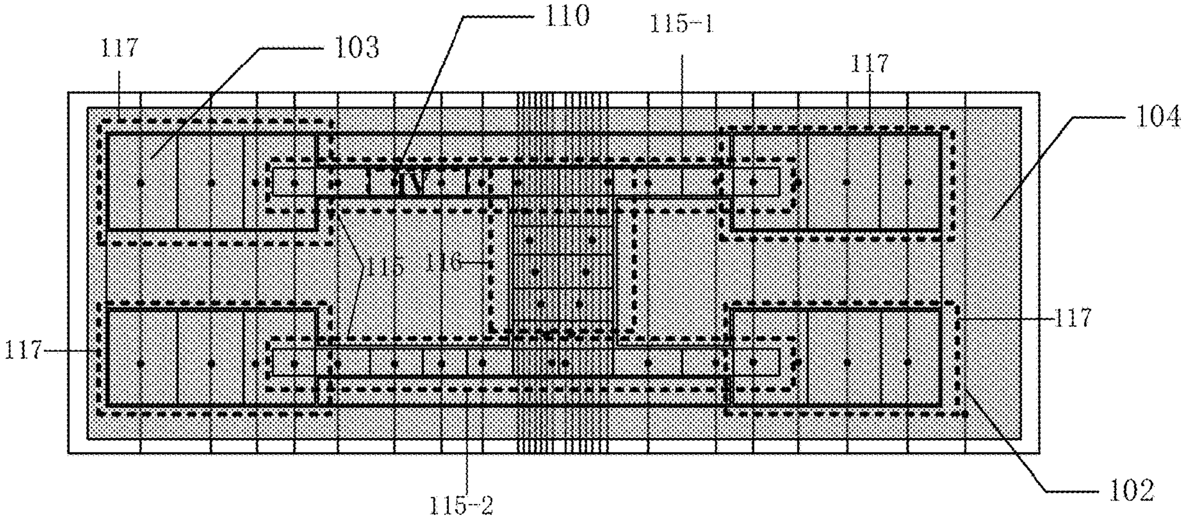
FIG. 8B illustrates an enlarged view of area III in FIG. 8A.

FIG. 8A illustrates a top view of a substrate 200 for driving droplets according to an embodiment of the present disclosure, and FIG. 8B illustrates an enlarged view of area III of FIG. 8A. The substrate 200 has substantially the same configuration as the substrate 100 shown in FIGS. 1A and 1B, and therefore, the same components are denoted by the same reference numerals. For example, the substrate 200 comprises a first base substrate 101, a plurality of leads 102 on the first base substrate 101, a plurality of driving electrodes 103 on a side of the plurality of leads 102 away from the first base substrate 101, and a shielding electrode 104 located on the side of the plurality of leads 102 away from the first base substrate 101 and grounded. Each of the plurality of leads 102 is electrically connected to at least one of the plurality of driving electrodes 103. An orthographic projection of the shielding electrode 104 on the first base substrate 101 and an orthographic projection of at least one of the plurality of leads 102 on the first base substrate 101 at least partially overlap. In addition, each driving electrode 103 and the shielding electrode 104 have a gap, so that the shielding electrode 104 is electrically insulated from the plurality of driving electrodes 103. The shielding electrode 104 may be located on the same layer as the multiple driving electrodes 103, or may be located between the layer where the multiple leads 102 are located and the layer where the multiple driving electrodes 103 are located. In FIG. 8A, the shielding electrode 104 and the plurality of driving electrodes 103 are located on the same layer. For the sake of brevity, in this embodiment, the same parts of the substrate 200 and the substrate 100 are no longer described, but the differences are mainly described.

As illustrated in FIGS. 8A and 8B, the substrate 200 comprises a first bonding area 105 and a second bonding area 106. The first bonding area 105 is located at one end of the plurality of leads 102 along the extending direction (that is, located at the area near the top of the first base substrate 101), and the second bonding area 106 is located at the other end of the plurality of leads 102 opposite to the one end along the extending direction (that is, located at the area near the bottom of the first base substrate 101). Each of the first bonding area 105 and the second bonding area 106 comprises a plurality of bonding electrodes arranged in a lateral direction, as represented by square blocks in the first bonding area 105 and the second bonding area 106 in the figure. Each of the plurality of leads 102 is electrically connected to the first bonding area 105 and the second bonding area 106. The driving electrodes 103 located in the same column are electrically connected to one bonding electrode of the first bonding area 105 and one bonding electrode of the second bonding area 106 via the same leas 102. In an example, a plurality of connectors (not illustrated) are provided on the first bonding area 105, and one end of the plurality of connectors is electrically connected to the plurality of bonding electrodes of the first bonding area 105, and the other end is, for example, electrically connected to an external test device. Since each driving electrode 103 is electrically connected to a corresponding bonding electrode of the first bonding area 105 via a lead 102, and the bonding electrode is electrically connected to a corresponding connector. Therefore, each driving electrode 103 can transmit, for example, a test signal (for example, a voltage signal on the driving electrode 103) to an external test device via a connector for testing. The connector is generally a precision connector, comprising but not limited to pogo pins. A pogo pin is a spring-type probe formed by the three basic components of a needle shaft, a spring, and a needle tube after being riveted and preloaded by a precision instrument, and its interior usually comprises a precision spring structure. Pogo pins are generally used for precision connections in electronic products such as mobile phones, portable electronic devices, communications, automobiles, medical treatment, and aerospace to improve the corrosion resistance, stability, and durability of these connectors. The second bonding area 106 may be used to connect a flexible circuit board (FPC), for example, to provide a corresponding voltage signal to each driving electrode 103 via the lead 102. During operation, signals are alternately provided to the leads 102 through the first bonding area 105 and the second bonding area 106 to achieve different functions.

As illustrated in FIG. 8B, the plurality of driving electrodes 103 comprises at least a first region 115, a second region 116 and a third region 117. The first region 115 includes a first sub-region 115-1 and a second sub-region 115-2. The first sub-region 115-1 and the second sub-region 115-2 are both arranged along a first direction. The second region 116 is arranged between the first sub-region 115-1 and the second sub-region 115-2 along a second direction, and the third region 117 is respectively arranged at both ends of the first sub-region 115-1 in the first direction and both ends of the second sub-region 115-2 in the first direction. Here, the first direction refers to a direction perpendicular to the extending direction of the plurality of leads 102 in the plane defined by the plurality of driving electrodes 103, that is, the horizontal direction in FIG. 8B; the second direction refers to a direction parallel to the extending direction of the plurality of leads 102 in the plane defined by the plurality of driving electrodes 103, that is, the vertical direction in FIG. 8B. The orthographic projections of the driving electrodes 103 in the first region 115 and the driving electrodes 103 in the second region 116 on the first base substrate 101 are all squares. The orthographic projections of the driving electrodes 103 in the third region 117 on the first base substrate 101 are all rectangular. In the driving electrode 103, the third region 117 is usually used as a liquid reservoir to store the fluid to be processed. The droplets separated from the liquid reservoir generally move in an expected path on the driving electrodes 103 of the first region 115 and the second region 116 in accordance with the applied voltage.

As illustrated in FIGS. 8A and 8B, at least a part of each lead 102 is designed as a straight line. This is slightly different from the lead 102 illustrated in FIG. 1A. A part of the plurality of leads 102 illustrated in FIG. 1A is designed in a bending line style. Of course, the embodiment of the present disclosure does not limit the wiring style of the lead 102. The electrode 114 is configured to be grounded, for example, it can be used to provide a ground signal for a conductive layer (for example, ITO) on the opposite substrate of the substrate 200.

As illustrated in the figure, the arrangement density of the plurality of leads 102 electrically connected to the plurality of driving electrodes 103 in the second region 116 is greater than the arrangement density of the plurality of leads 102 electrically connected to the plurality of driving electrodes 103 in the third region 117. This wiring method is related to the arrangement of the driving electrodes 103 of each module. It can be seen from the figure that each square driving electrode 103 in the second region 116 is significantly smaller than each rectangular driving electrode 103 in the third region 117, and the square driving electrodes 103 in the second region 116 are arranged more closely. The different designs of the different modules of the driving electrode 103 require corresponding adjustments to the wiring manner of the corresponding leads 102.

As illustrated in the figure, each driving electrode 103 is electrically connected to a lead 102 via a via hole 110. A plurality of via holes 110 corresponding to the first sub-region 115-1 and the third region 117 at both ends of the first sub-region 115-1 along the first direction are arranged in a straight line in the first direction; a plurality of via holes 110 corresponding to the second sub-region 115-2 and the third region 117 at both ends of the second sub-region 115-2 along the first direction are arranged in a straight line in the first direction. A part of a plurality of via holes 110 corresponding to the second region 116 is arranged along a first straight line, another part of the plurality of via holes 110 corresponding to the second region 116 is arranged along a second straight line, and the first straight line and the second straight line intersect on a side of the second region 116 close to the second sub-region 115-2, and approximately enclose an “inverted triangle” shape.

Figure 8C:
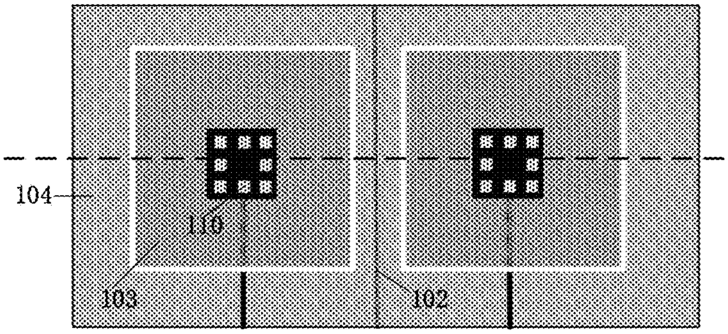
FIG. 8C illustrates an enlarged view of area IV in FIG. 8B.

FIG. 8C is an enlarged view of area IV in FIG. 8B. As illustrated in the figure, each driving electrode 103 is electrically connected to one lead 102 via eight via holes 110. Each lead 102 comprises a rectangular connection platform at the electrical connection where the lead is connected to the corresponding driving electrode 103, and the rectangular connection platform is embedded with eight square via holes 110. It should be noted that the shape of the via hole 110 is not limited to a square, it can also be any other suitable shape, such as a circle, a rectangle, a hexagon, an octagon, an irregular shape, and the like. Correspondingly, the connection platform can also have any suitable shape. The number of via holes between each driving electrode 103 and the lead 102 is large and the hole diameter is large, which can effectively reduce the resistance of via hole. In addition, each driving electrode 103 is electrically connected to a lead 102 through eight via holes 110, which can prevent the failure of the substrate 200 caused by partial via holes being burnt. Therefore, by electrically connecting each driving electrode 103 to one lead 102 via eight via holes 110, the reliability of the substrate 200 can be effectively improved.

The substrate 200 can achieve substantially the same technical effect as the substrate 100. To put it simply, the substrate 200 is provided with the shielding electrode 104 to shield the influence of the voltage of the lead 102 on the driving of the droplet, thereby improving the generation accuracy of the droplet; by optimizing the wiring method of the lead 102, multiple driving electrodes 103 in the same column can be electrically connected to the same bonding electrode via a lead 102, thereby reducing the number of bonding electrodes; moreover, different wiring schemes are designed according to the different sizes of the droplets, which further reduces the number of bonding electrodes under the premise of ensuring the smooth driving of the droplets; by avoiding arranging the lead 102 directly below the driving electrode 103 that is not electrically connected to it, the influence of crosstalk is minimized, and the influence of the coupling voltage on the driving of the droplet is effectively reduced; and by increasing the number of via holes between the driving electrode 103 and the lead 102, the reliability of the substrate 200 is effectively improved.

Figure 9:
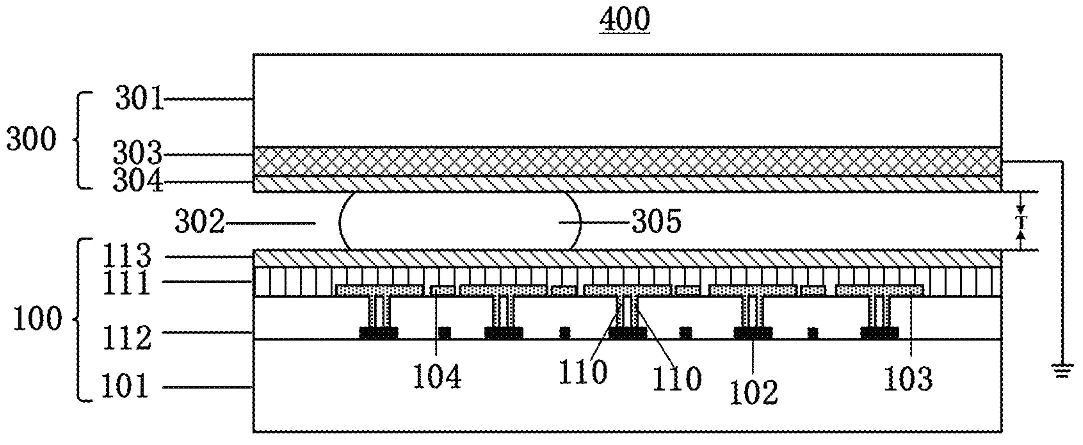
FIG. 9 illustrates a cross-sectional view of a microfluidic device according to an embodiment of the present disclosure.

According to another aspect of the present disclosure, a microfluidic device is provided. The microfluidic device comprises the substrate 100 or 200 described in any of the previous embodiments. The following takes the microfluidic device comprising the substrate 100 as an embodiment to introduce. FIG. 9 illustrates a cross-sectional view of the microfluidic device 400. As illustrated in FIG. 9, the microfluidic device 400 comprises a substrate 100, another substrate 300 opposite to the substrate 100, and a space 302 between the substrate 100 and another substrate 300. The space 302 is used to accommodate the conductive droplets 305. Another substrate 300 comprises a second base substrate 301, a conductive layer 303 on the second base substrate 301, and a hydrophobic layer 304 on a side of the conductive layer 303 away from the second base substrate 301.

The first base substrate 101 and the second base substrate 301 may be made of the same or different any suitable materials, for example, made of a rigid material or a flexible material. The rigid or flexible material comprises, but is not limited to, glass, ceramic, silicon, polyimide and other materials. In one example, both the first base substrate 101 and the second base substrate 301 are made of glass. The glass material can reduce the surface roughness of the first base substrate 101 and the second base substrate 301, and facilitate the movement of the droplet 305 on the surface of the corresponding film layer.

The conductive layer 303 is grounded and can be formed of any suitable material. The embodiment of the present disclosure does not specifically limit the material of the conductive layer 303. In one example, the material of the conductive layer 303 is ITO, and its thickness in the direction perpendicular to the second base substrate 301 is about 52 nm. The hydrophobic layer 304 and the hydrophobic layer 113 may be made of the same material. In one example, the material of the hydrophobic layer 304 is Teflon, and its thickness in the direction perpendicular to the second base substrate 301 is about 52 nm.

In some embodiments, the ratio of the length of each driving electrode 103 in the lateral direction to the thickness T of the space 302 in the direction perpendicular to the first base substrate 101 is between 5 and 20. The lateral direction refers to a direction perpendicular to the extending direction of the plurality of leads 102 in a plane defined by the plurality of driving electrodes 103. In the conventional microfluidic device, the ratio of the size of the driving electrode to the thickness (i.e., the cell thickness) of the space between the substrate and another substrate is not limited. The inventor found that an improper ratio will cause the driving electrode to fail to drive the droplets. In the embodiment of the present disclosure, the ratio of the length of each driving electrode 103 in the lateral direction to the thickness T of the space 302 is between 5 and 20. When the ratio is less than 5, the deformation of the droplet is too small to contact the next driving electrode 103, and the split neck cannot be formed during the splitting process of the droplet, resulting in the failure of the manipulation of the droplet. When the ratio is greater than 20, the electrowetting force of the droplet cannot overcome the surface resistance, which will also lead to the failure of the manipulation of the droplet.

FIG. 9 does not illustrate an opening for introducing the droplet 305 into or out of the microfluidic device 400. The opening may be arranged on the side of the space 302, or may be arranged on another substrate 300, or at any other suitable position, which is not specifically limited in the embodiment of the present disclosure. In the space 302, a conductive droplet 305 is bound. The droplet 305 may be any fluid that can be manipulated by electrowetting, which is not specifically limited in the embodiment of the present disclosure. The space in the space 302 that is not occupied by the droplet 305 may also be filled with a non-conductive non-ionic liquid that does not mix with the droplet 305. The non-ionic liquid generally selects a liquid with a surface tension lower than that of the droplet 305.

The reason why the microfluidic device 400 can manipulate the droplet 305 is achieved by the principle of dielectric wetting. To put it simply, by applying different potentials to the two adjacent driving electrodes 103 and cooperating with the grounded conductive layer 303, under the dielectric wetting effect, the three-phase contact angle of the droplet 305 becomes smaller. As a result, the droplet 305 is deformed asymmetrically and an internal pressure difference is generated, causing the droplet 305 to move. Therefore, by controlling the potentials applied to the respective driving electrodes 103, the droplets 305 can be controlled to perform corresponding actions (for example, moving, mixing, separating, etc.) according to the expected path. The specific content of the dielectric wetting principle can refer to relevant teaching materials in the field, and this embodiment will not be repeated.

The microfluidic device 400 can be used in various suitable applications, comprising but not limited to nucleic acid extraction and library preparation. The embodiments of the present disclosure do not specifically limit the use of the microfluidic device 400. In one example, the microfluidic device 400 is used for library preparation. Library preparation is an important step in the gene sequencing process, and its purpose is to increase the concentration of DNA to be tested and prepare for subsequent sequencing work. The library preparation technology based on microfluidics can greatly reduce the library preparation time, reduce the amount of reagents used, and can greatly improve the level of automation.

The microfluidic device 400 provided by the embodiment of the present disclosure may have basically the same technical effect as the substrate 100 or 200 described in the previous embodiment, and therefore, for the sake of brevity, the description will not be repeated here.

Figure 10:
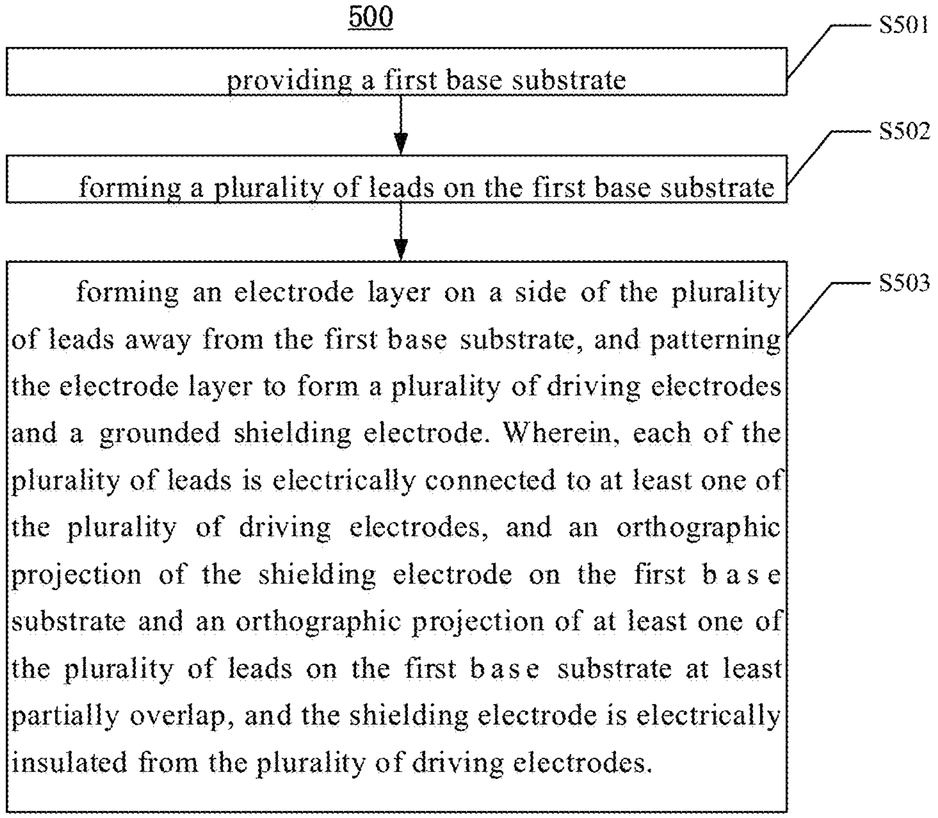
FIG. 10 illustrates a flowchart of a method for manufacturing a substrate according to an embodiment of the present disclosure.

According to another aspect of the present disclosure, a method of manufacturing a substrate is provided, and the method is applicable to the substrate 100 or 200 described in any of the foregoing embodiments. Referring to FIG. 1B and FIG. 10, the method 500 comprises the following steps:

- S501: providing a first base substrate 101;
- S502: forming a plurality of leads 102 on the first base substrate 101;
- S503: forming an electrode layer on a side of the plurality of leads 102 away from the first base substrate 101, and patterning the electrode layer to form a plurality of driving electrodes 103 and a grounded shielding electrode 104. Wherein, each of the plurality of leads 102 is electrically connected to at least one of the plurality of driving electrodes 103, and an orthographic projection of the shielding electrode 104 on the first base substrate 101 and an orthographic projection of at least one of the plurality of leads 102 on the first base substrate 101 at least partially overlap. In addition, the shielding electrode 104 is electrically insulated from the plurality of driving electrodes 103.

In some embodiments, step S503 further includes: forming an electrode layer on the side of the plurality of leads 102 away from the first base substrate 101, patterning the electrode layer to form a plurality of driving electrodes 103, a grounded shielding electrode 104, and a ground electrode 107 surrounding the periphery of the shielding electrode 104.

The method for manufacturing other film layers of the substrate 100 or 200 can refer to the description in the related art, which is not specifically limited in the embodiment of the present disclosure.

The shielding electrode 104 and the plurality of driving electrodes 103 are formed through one patterning process, which can reduce the use of masks, thereby saving costs and improving production efficiency. By making the orthographic projection of the shielding electrode 104 on the first base substrate 101 and the orthographic projection of at least one of the plurality of leads 102 on the first base substrate 101 at least partially overlap, the shielding electrode 104 can shield the voltage of the leads 102 located under the plurality of driving electrodes 103, the voltage of the leads 102 does not interfere with the driving of the droplets contained in the microfluidic device including the substrate 100 or 200 by the driving electrode 103. So that the droplets can perform corresponding actions (such as moving, separating, mixing, etc.) according to the expected way and path, so as to ensure that the accurate droplet volume is generated during the droplet generation process, and the generation accuracy of the droplet can be improved.

In the description of the present disclosure, the terms "upper", "lower", "left", "right", etc. indicate the orientation or positional relationship based on the orientation or positional relationship shown in the drawings, and are only used to facilitate the description of the present disclosure. It is not required that the present disclosure must be constructed and operated in a specific orientation, and therefore cannot be understood as a limitation to the present disclosure.

In the description of this specification, the description with reference to the terms "one embodiment", "another embodiment", etc. means that a specific feature, structure, material, or characteristic described in conjunction with the embodiment is comprised in at least one embodiment of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other. In addition, it should be noted that in this specification, the terms "first" and "second" are only used for descriptive purposes, and cannot be understood as indicating or implying relative importance or implicitly indicating the number of indicated technical features.

As those skilled in the art will understand, although the various steps of the method in the present disclosure are described in a specific order in the accompanying drawings, this does not require or imply that these steps must be performed in the specific order, unless the context clearly dictates otherwise. Additionally or alternatively, multiple steps can be combined into one step for execution, and/or one step can be decomposed into multiple steps for execution. In addition, other method steps can be inserted between the steps. The inserted step may represent an improvement of the method such as described herein, or may be unrelated to the method. In addition, a given step may not be fully completed before the next step starts.

The above are only specific implementations of the present disclosure, but the protection scope of the present disclosure is not limited thereto. Any person skilled in the art can easily think of changes or substitutions within the technical scope disclosed in the present disclosure, and they should be covered by the protection scope of the present disclosure. Therefore, the protection scope of the present disclosure should be subject to the protection scope of the claims.

The invention claimed is:

1. A substrate for driving droplets, the substrate being a passive digital microfluidic substrate, comprising:

- a first base substrate;
- a plurality of leads on the first base substrate;
- a plurality of driving electrodes on a side of the plurality of leads away from the first base substrate; and
- a shielding electrode on the side of the plurality of leads away from the first base substrate and grounded,
- wherein an orthographic projection of each lead on the first base substrate only partially overlaps an orthographic projection of at least one of the plurality of driving electrodes electrically connected to said lead on the first base substrate,
- wherein each of the plurality of driving electrodes is electrically connected to one of the plurality of leads via at least two via holes,
- wherein an orthographic projection of the shielding electrode on the first base substrate and an orthographic projection of at least one of the plurality of leads on the first base substrate at least partially overlap, and the shielding electrode and the plurality of driving electrodes are electrically insulated, and
- wherein the shielding electrode and the plurality of driving electrodes are in a same layer, and a part of the shielding electrode is around each of the plurality of driving electrodes, the orthographic projection of the shielding electrode on the first base substrate and an orthographic projection of the plurality of driving electrodes on the first base substrate do not overlap.

2. The substrate of claim 1, further comprising a first bonding area and a second bonding area on the first base substrate, wherein each of the plurality of leads is electrically connected to at least one of the first bonding area and the second bonding area.

3. The substrate of claim 2, wherein the plurality of driving electrodes comprises a first portion, wherein the plurality of driving electrodes in a same column in the first portion are electrically connected to at least one of one bonding electrode of the first bonding area and one bonding electrode of the second bonding area via a same lead of the plurality of leads; and wherein a direction of the same column is an extending direction of the plurality of leads.

4. The substrate of claim 3, wherein the plurality of driving electrodes further comprises a second portion, the plurality of driving electrodes in a same column in the second portion and a part of the plurality of leads are connected in a one by one correspondence, and each of the plurality of driving electrodes in the same column in the second portion is electrically connected to at least one of the first bonding area and the second bonding area via a corresponding lead.

5. The substrate of claim 2, wherein the plurality of driving electrodes comprises a third portion close to a side of the first bonding area, and the third portion comprises a part of the plurality of driving electrodes, and wherein the first bonding area comprises a first bonding electrode and a second bonding electrode, the first bonding electrode is electrically connected to each odd-numbered driving electrode of the plurality of driving electrodes in the third portion via a first lead of the plurality of leads, and the second bonding electrode is electrically connected to each even-numbered driving electrode of the plurality of driving electrodes in the third portion via a second lead of the plurality of leads.

6. The substrate of claim 5, wherein an orthographic projection of the first lead on the first base substrate is at least partially between an orthographic projection of the plurality of driving electrodes electrically connected to the second lead on the first base substrate and an orthographic projection of the first bonding area on the first base substrate, and wherein an orthographic projection of the second lead on the first base substrate is at least partially between an orthographic projection of the plurality of driving electrodes electrically connected to the first lead on the first base substrate and an orthographic projection of the second bonding area on the first base substrate.

7. The substrate of claim 2, wherein the plurality of driving electrodes comprises a third portion close to a side of the first bonding area, and the third portion comprises a part of the plurality of driving electrodes, and wherein the first bonding area comprises a first bonding electrode, a second bonding electrode, and a third bonding electrode, the first bonding electrode is electrically connected to the $(3N-2)^{th}$ driving electrodes of the plurality of driving electrodes in the third portion via a first lead of the plurality of leads, the second bonding electrode is electrically connected to the $(3N-1)^{th}$ driving electrodes of the plurality of driving electrodes in the third portion via a second lead of the plurality of leads, the third bonding electrode is electrically connected to the $(3N)^{th}$ driving electrodes of the plurality of driving electrodes in the third portion via a third lead of the plurality of leads, and N is a positive integer greater than or equal to 1.

8. The substrate of claim 7, wherein an orthographic projection of the first lead on the first base substrate is at least partially between an orthographic projection of the plurality of driving electrodes in the third portion respectively electrically connected to the second lead and the third lead on the first base substrate and an orthographic projection of the first bonding area on the first base substrate, wherein an orthographic projection of the second lead on the first base substrate is at least partially between an orthographic projection of the plurality of driving electrodes in the third portion respectively electrically connected to the first lead and the third lead on the first base substrate and an orthographic projection of the second bonding area on the first base substrate, and wherein an orthographic projection of the third lead on the first base substrate is at least partially between orthographic projections of two adjacent driving electrodes on the first base substrate, the two adjacent driving electrodes are respectively a driving electrode of the plurality of driving electrodes in the third portion electrically connected to the first lead, and a driving electrode of the plurality of driving electrodes in the third portion electrically connected to the second lead.

9. The substrate of claim 1, wherein at least a part of each of the plurality of leads extends in a linear direction.

10. The substrate of claim 1, wherein the plurality of driving electrodes comprises at least a first region, a second region, and a third region that are sequentially arranged in a lateral direction, and the lateral direction is a direction perpendicular to an extending direction of the plurality of leads in a plane defined by the plurality of driving electrodes.

11. The substrate of claim 10, wherein the plurality of driving electrodes in the first region comprise at least a first driving electrode, a second driving electrode, and a third driving electrode that are sequentially arranged along the lateral direction, wherein an orthographic projection of the first driving electrode on the first base substrate is a trapezoid, and orthographic projections of the second driving electrode and the third driving electrode on the first base substrate are both rectangular, and wherein a distance between any two adjacent driving electrodes of the first driving electrode, the second driving electrode and the third driving electrode is 20 μm.

12. The substrate of claim 10, wherein the plurality of driving electrodes in the second region comprise a fourth driving electrode and a fifth driving electrode that are sequentially arranged along the lateral direction and a sixth driving electrode and a seventh driving electrode on both sides of the fourth driving electrode and the fifth driving electrode, wherein orthographic projections of the fourth driving electrode and the fifth driving electrode on the first base substrate are both square, and orthographic projections of the sixth driving electrode and the seventh driving electrode on the first base substrate are both rectangular, and wherein a distance between any two adjacent driving electrodes of the fourth driving electrode, the fifth driving electrode, the sixth driving electrode, and the seventh driving electrode is 20 μm.

13. The substrate of claim 10, wherein the plurality of driving electrodes in the third region comprise at least an eighth driving electrode and a ninth driving electrode that are sequentially arranged along the lateral direction, wherein orthographic projections of the eighth driving electrode and the ninth driving electrode on the first base substrate are both square, and wherein a distance between the eighth driving electrode and the ninth driving electrode is 20 μm.

14. The substrate of claim 1, wherein the plurality of driving electrodes comprise at least a first region, a second region, and a third region, and the first region comprises a first sub-region and a second sub-region, the first sub-region and the second sub-region are respectively arranged along a first direction, the second region is between the first sub-region and the second sub-region along a second direction, and the third region is respectively arranged at both ends of the first sub-region along the first direction and both ends of the second sub-region along the first direction, and wherein the first direction is a direction perpendicular to an extending direction of the plurality of leads in a plane defined by the plurality of driving electrodes, the second direction is a direction parallel to the extending direction of the plurality of leads in the plane defined by the plurality of driving electrodes.

15. The substrate of claim 14, wherein an orthographic projection of each driving electrode in the first region and an orthographic projection of each driving electrode in the second region on the first base substrate are square, and an orthographic projection of each driving electrode in the third region on the first base substrate is rectangular.

16. The substrate of claim 14, wherein an arrangement density of the plurality of leads electrically connected to the plurality of driving electrodes in the second region is greater than an arrangement density of the plurality of leads electrically connected to the plurality of driving electrodes in the third region.

17. The substrate of claim 14, wherein a plurality of via holes corresponding to the first sub-region and the third region at the both ends of the first sub-region along the first direction are arranged in a straight line in the first direction, wherein a plurality of via holes corresponding to the second sub-region and the third region at the both ends of the second sub-region along the first direction are arranged in a straight line in the first direction, and wherein a part of a plurality of via holes corresponding to the second region is arranged along a first straight line, another part of the plurality of via holes corresponding to the second region is arranged along a second straight line, and the first straight line and the second straight line intersect on a side of the second region close to the second sub-region.

18. The substrate of claim 1, wherein each of the plurality of driving electrodes is electrically connected to one of the plurality of leads via eight via holes.

19. A microfluidic device comprising the substrate according to claim 1, another substrate opposite to the substrate, and a space between the substrate and the another substrate, wherein the another substrate comprises:

a second base substrate;

a conductive layer on the second base substrate; and a hydrophobic layer on a side of the conductive layer away from the second base substrate.

20. The microfluidic device of claim 19, wherein a ratio of a length of each of the plurality of driving electrodes in a lateral direction to a thickness of the space in a direction perpendicular to the first base substrate is between 5 and 20, and the lateral direction is a direction perpendicular to an extending direction of the plurality of leads in a plane defined by the plurality of driving electrodes.

* * * * *